Figure 1:
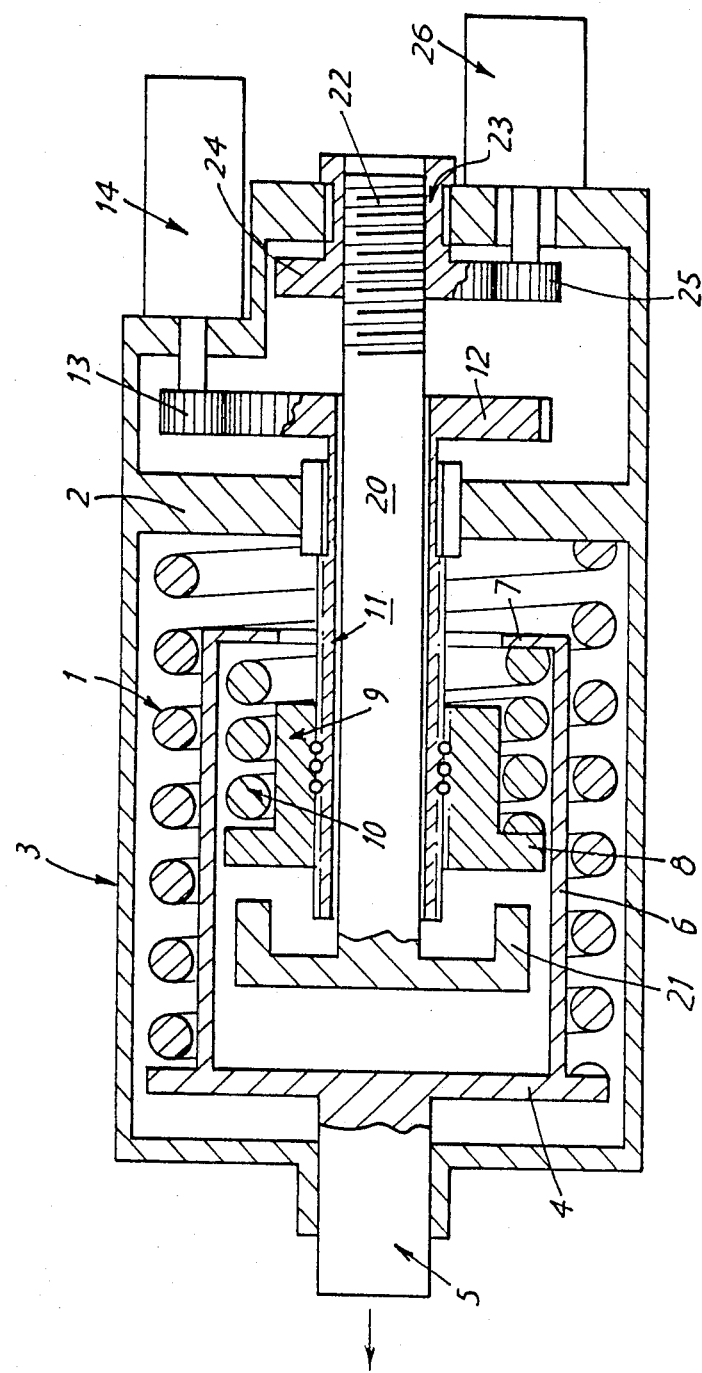

United States Patent [19]

Wickham et al.

[11] Patent Number: 4,546,298
[45] Date of Patent: Oct. 8, 1985

[54] ELECTRIC ACTUATORS

[75] Inventors: David J. Wickham; Jack Washbourn, both of Chippenham; Howard F. Cogan, Leire, all of England

[73] Assignee: Westinghouse Brake & Signal Co., Wiltshire, England

[21] Appl. No.: 607,633

[22] Filed: May 7, 1984

[30] Foreign Application Priority Data

| May 12, 1983 | [GB] | United Kingdom | 8313102 |
| Jun. 17, 1983 | [GB] | United Kingdom | 8316544 |
| Jun. 17, 1983 | [GB] | United Kingdom | 8316545 |
| Jun. 23, 1983 | [GB] | United Kingdom | 8317064 |
| Oct. 4, 1983 | [GB] | United Kingdom | 8326467 |
| Mar. 20, 1984 | [GB] | United Kingdom | 8407177 |

[51] Int. Cl.$^4$ ............................ H02K 7/10; H02K 7/06
[52] U.S. Cl. ..................................... 318/372; 318/254; 318/466; 318/362; 318/371; 318/273; 318/269; 310/80; 310/83; 188/162
[58] Field of Search ............ 318/371, 372, 362, 301, 318/261, 269, 273, 614; 310/77, 80, 83; 180/170; 188/162, 158, 74, 33; 246/182 R; 192/116.5, 147, 140; 267/168

[56] References Cited

U.S. PATENT DOCUMENTS

| 874,219 | 12/1907 | Mahoney | 188/162 X |
| 2,418,351 | 4/1947 | Jackson | 318/261 |
| 2,446,393 | 8/1948 | Russell | 310/83 |
| 2,479,019 | 8/1949 | Ochtman | 310/83 |
| 2,480,212 | 8/1949 | Baines | 310/83 |
| 2,756,014 | 7/1956 | Leibfried | 267/170 X |
| 3,013,624 | 12/1961 | De Remer et al. | 188/162 X |
| 3,399,879 | 9/1968 | Hojo et al. | 267/178 |
| 3,659,683 | 5/1972 | Betzing | 188/162 |
| 4,136,304 | 1/1979 | Baechler et al. | 318/372 |
| 4,364,111 | 12/1982 | Jocz | 318/466 |
| 4,393,319 | 7/1983 | Bock | 310/80 |
| 4,445,075 | 4/1984 | Fry | 318/434 |
| 4,463,291 | 7/1984 | Usry | 318/254 |

Primary Examiner—William M. Shoop, Jr.
Assistant Examiner—Shik Luen Paul Ip
Attorney, Agent, or Firm—Larson and Taylor

[57] ABSTRACT

An electric actuator having an electric motor operable to determine the output force generated on an output member by a spring system, and an adjustable stop by which can be limited the maximum value of the output force, the position of the adjustable stop being variable in accordance with variation of the required maximum value of the output force to be exerted by the output member.

14 Claims, 13 Drawing Figures

ELECTRIC ACTUATORS

This invention relates to electric actuators and, more particularly, to electric actuators having an electric motor operable to determine the output force generated on an output member by a spring system.

For such actuators it sometimes desirable to limit the maximum force which the actuator is to be permitted to exert. For example, in the use of such actuators as vehicle brake actuators, particularly for rail vehicles, it may be desirable to limit the maximum force in accordance with the load of the vehicle. This may well be particularly desirable when the tare-to-loaded ratio of the vehicle is particularly high. In the absence of any such limitation, there is a danger that the vehicle may be over-braked when empty with consequent risk of skidding during braking or, conversely, that the vehicle will be under-braked when loaded with a consequent excessive braking distance.

Accordingly, the present invention provides an electric actuator having an electric motor operable to determine the output force generated on an output member by a spring system, and an adjustable stop by which can be limited the maximum value of the output force, the position of the adjustable stop being variable in accordance with variation of the required maximum value of the output force to be exerted by the output member.

The value of the output force may be limited by the adjustable stop sensing that the output force has reached the required maximum and thereby terminating operation of the electric motor in a direction further to increase the output force generated by the spring system.

The electric motor may be operable to determine the length of a spring in the spring system and thereby to determine the output force generated by the spring system, the electric motor being arranged to drive a driven member abutted by one end of said spring. The driven member may then be threadedly-engaged with a threaded member, operation of the electric motor relatively rotating the driven member and the threaded member. The adjustable stop may be so arranged as to be engaged by the driven member as it is driven by the electric motor to vary the length of the spring. The spring may be a force-applying control spring and the spring system then including a force-applying power spring arranged to exert a force on the output member, the control spring being arranged with respect to the power spring such that the force exerted by the control spring is detracted from the force exerted by the power spring to determine a residual force which is the output force exerted on the output member and the electric motor being operable to vary the length of the control spring and, therefore, the detractive force exerted by the control spring. In this case, the adjustable stop may be an electric switch in the control circuit of the electric motor, the switch being operated by the driven member when it reaches a position determined by the length of the control spring which is indicative of the detractive force being exerted by the control spring having been reduced to a value such that the residual force exerted by the power spring is that which corresponds to the required maximum value of the output force, operation of the switch thereby terminating operation of the electric motor in the direction further to reduce the force exerted by the control spring. Alternatively, the adjustable stop may physically prevent any further variation of the length of the control spring in the sense further to reduce the detractive force exerted by it when it is engaged by the driven member. The adjustable stop may be movable with the output member being variably positional with respect thereto. When as above described, the driven member is threadedly-engaged with a threaded member and operation of the electric motor relatively rotates the driven member and the threaded member, the threaded member and the adjustable stop may each have a clutch face engageable with the clutch face of the other, engagement of the clutch faces preventing further relative rotation of the driven member and the threaded member. The clutch face of the threaded member may be movable axially of but non-rotational with respect to the threaded member and be restrained for axial movement with but free for rotational movement with respect to, the driven member. The adjustable stop may be resiliently collapsible in the direction of the length of the control spring.

When the value of the output force is limited by the adjustable stop sensing that the output force has reached the required maximum and thereby terminating operation of the electric motor in a direction further to increase the output force generated by the spring system and the electric motor is operable to determine the length of a spring in the spring system and thereby to determine the output force generated by the spring system, the electric motor being arranged to drive a driven member abutted by one end of said spring, the spring may be a power spring which constitutes the sole spring of the spring system, the electric motor being operable directly to vary the length of the power spring and thus determine the output force generated on the output member. Alternatively, the actuator may be a spring-applied actuator in which the spring (which constitutes the sole spring of the spring system) is pre-compressed by the electric motor and is subsequently released to apply the output force held stored in the spring by its pre-compression on the output member, the driven member being the output member and the adjustable stop being a switch in the control circuit of the electric motor which is operable to terminate further operation of the electric motor when the spring has been compressed to an extent to store in the spring a potential output force of the required maximum value.

Figure 2:
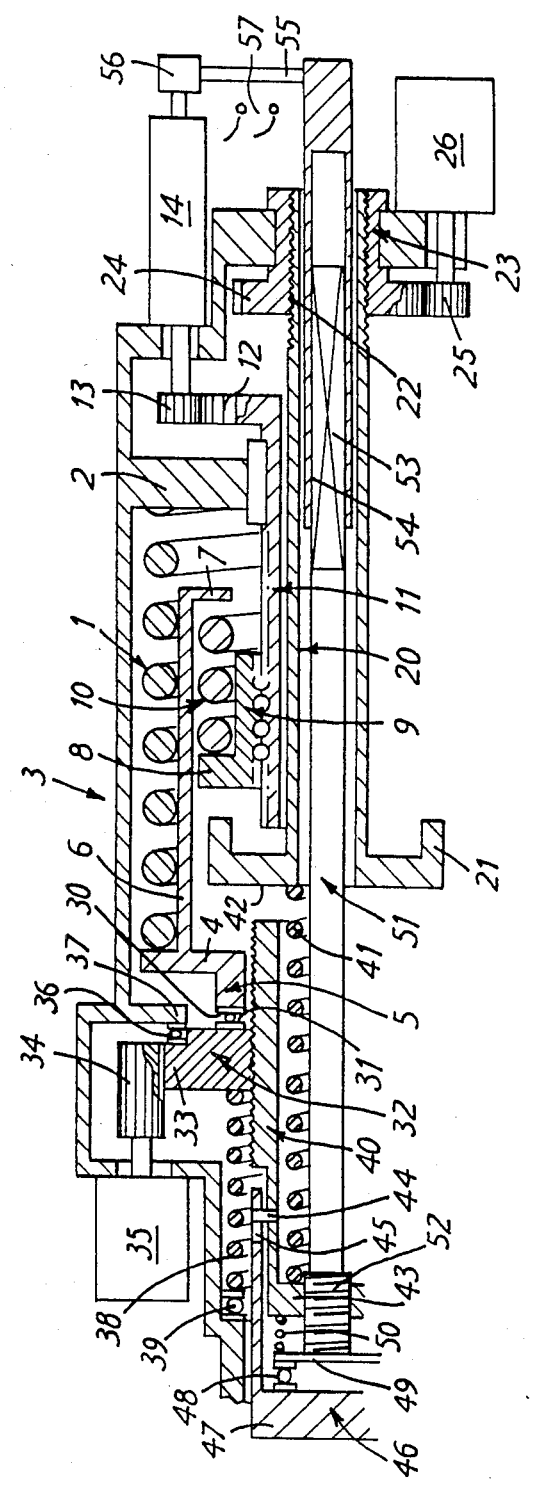
Figure 3:
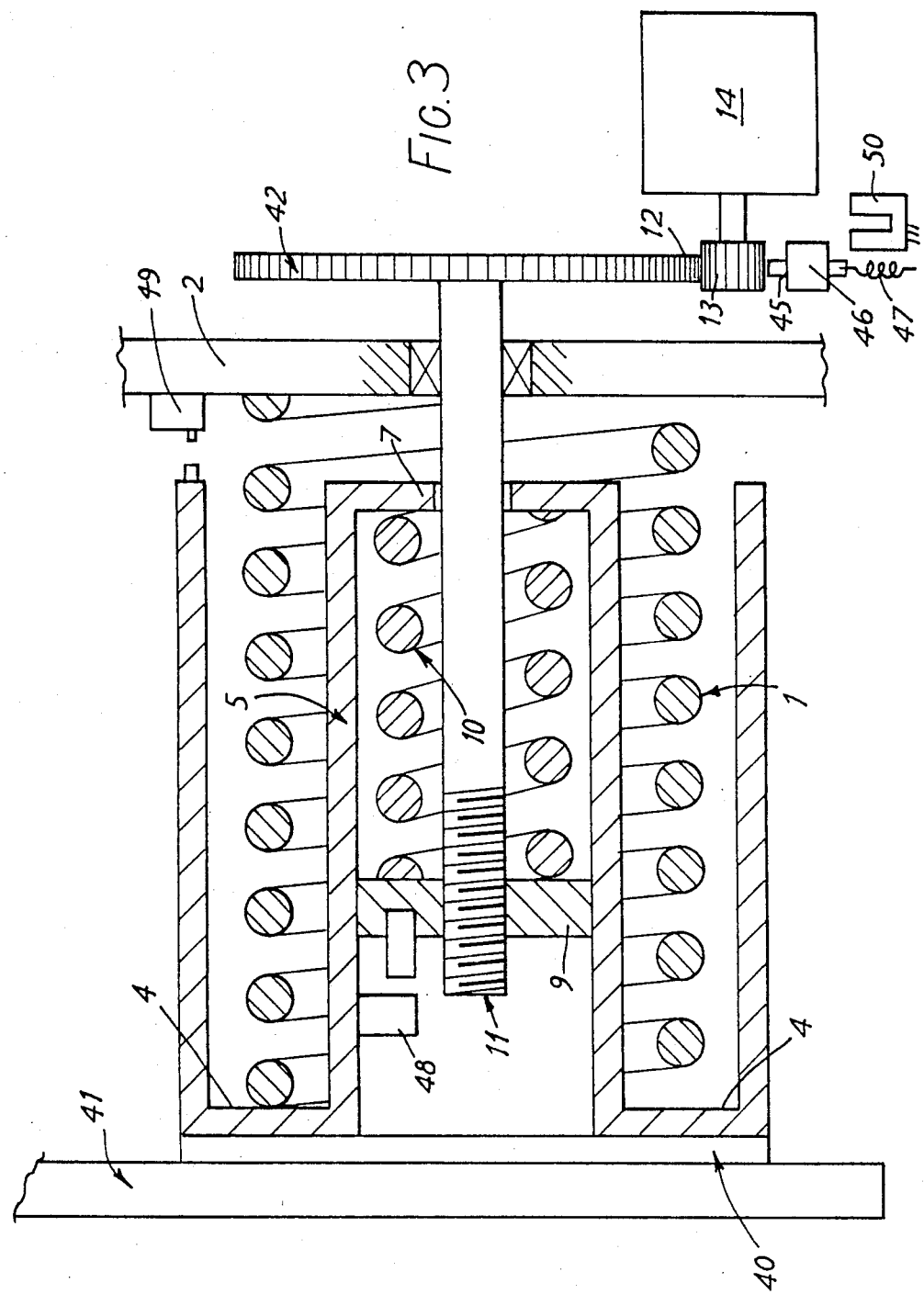
Figure 4:
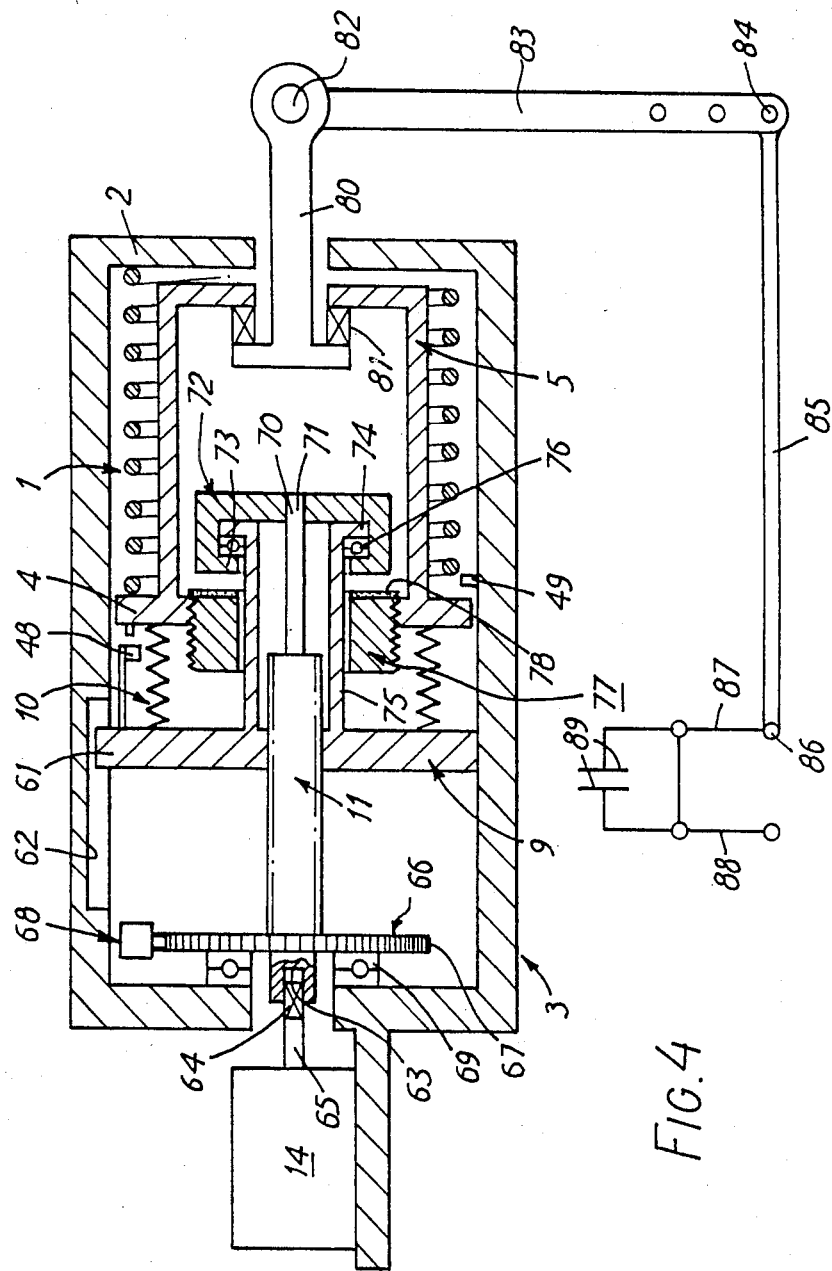
Figure 5:
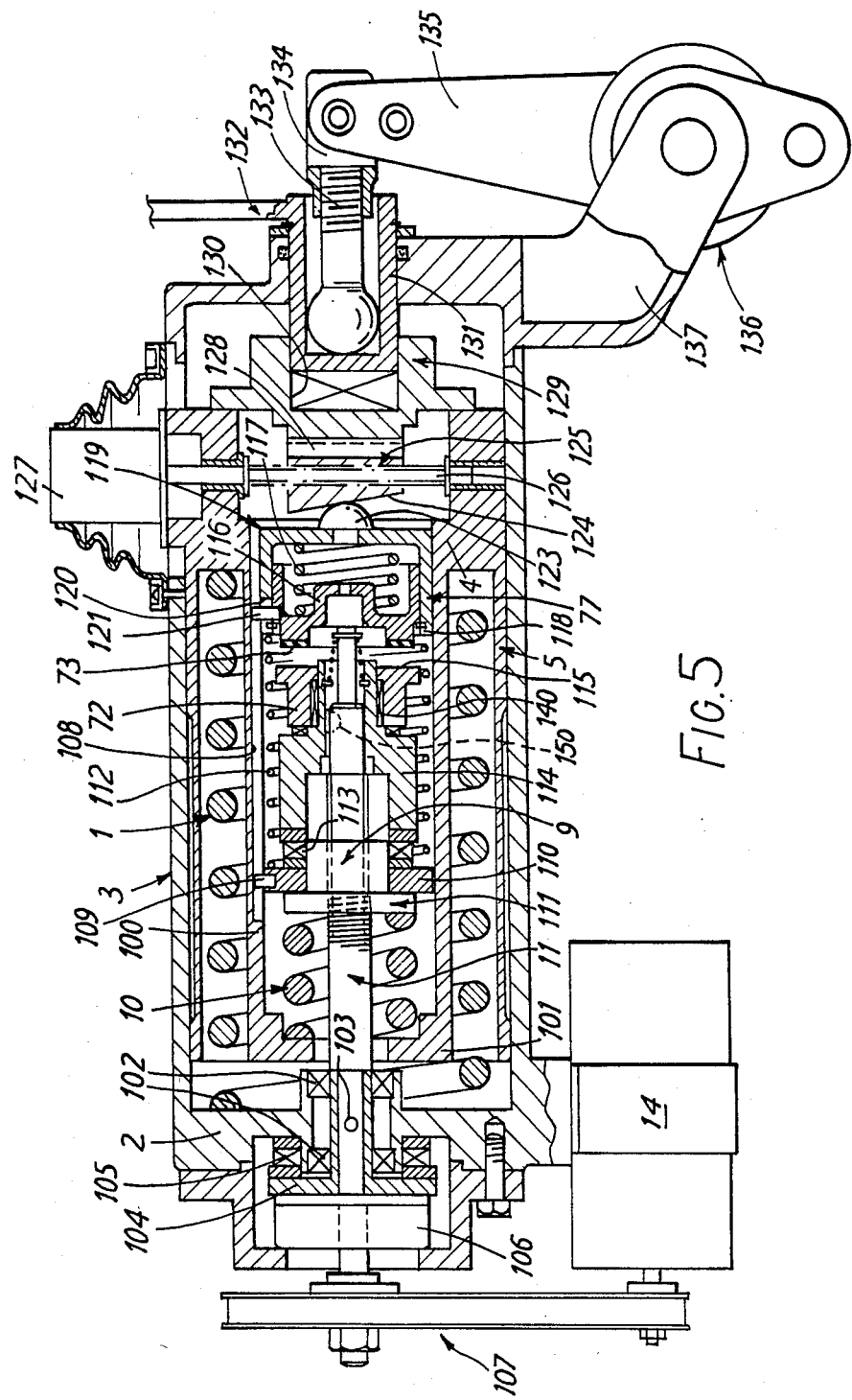
Figure 6:
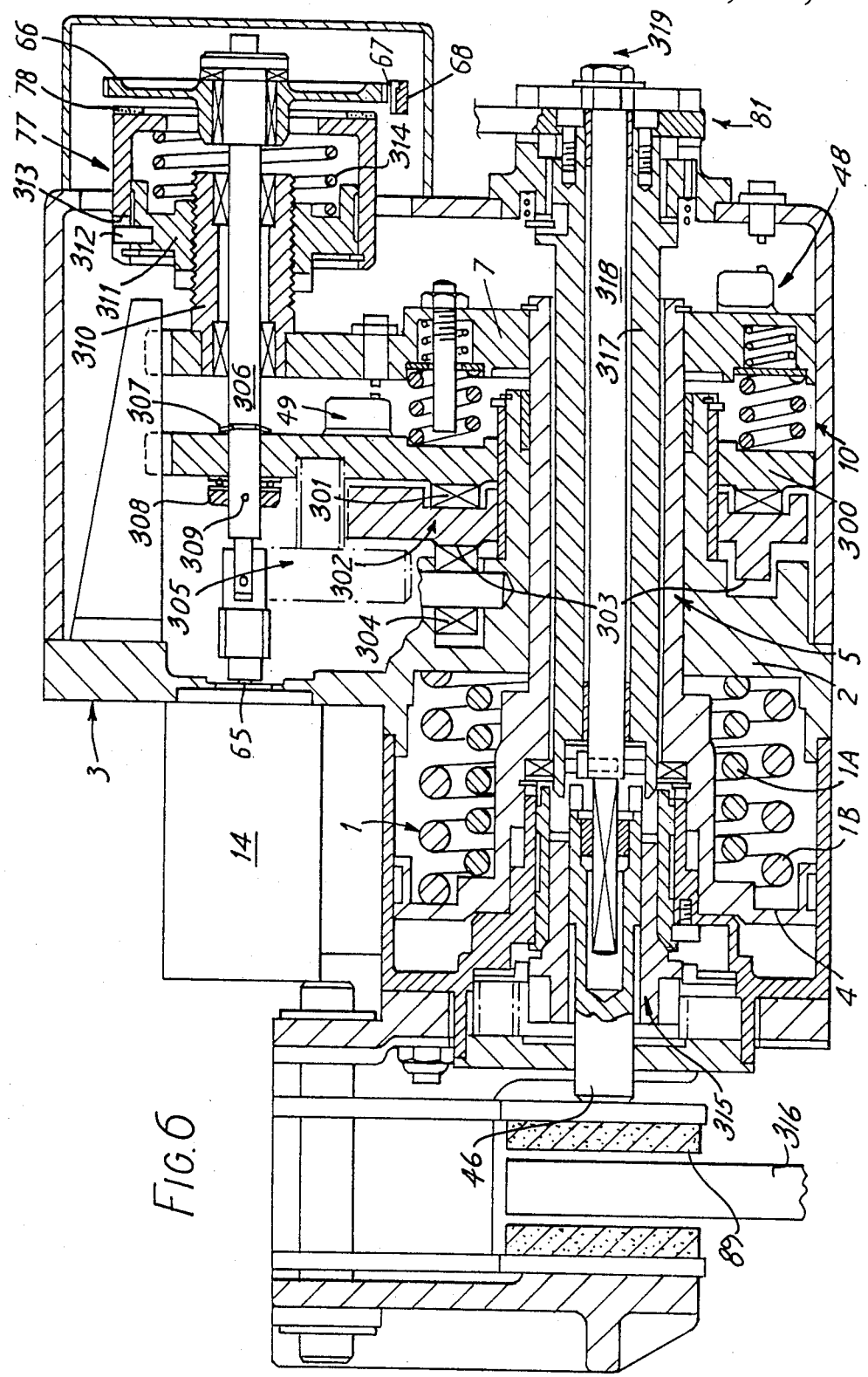
Figure 7:
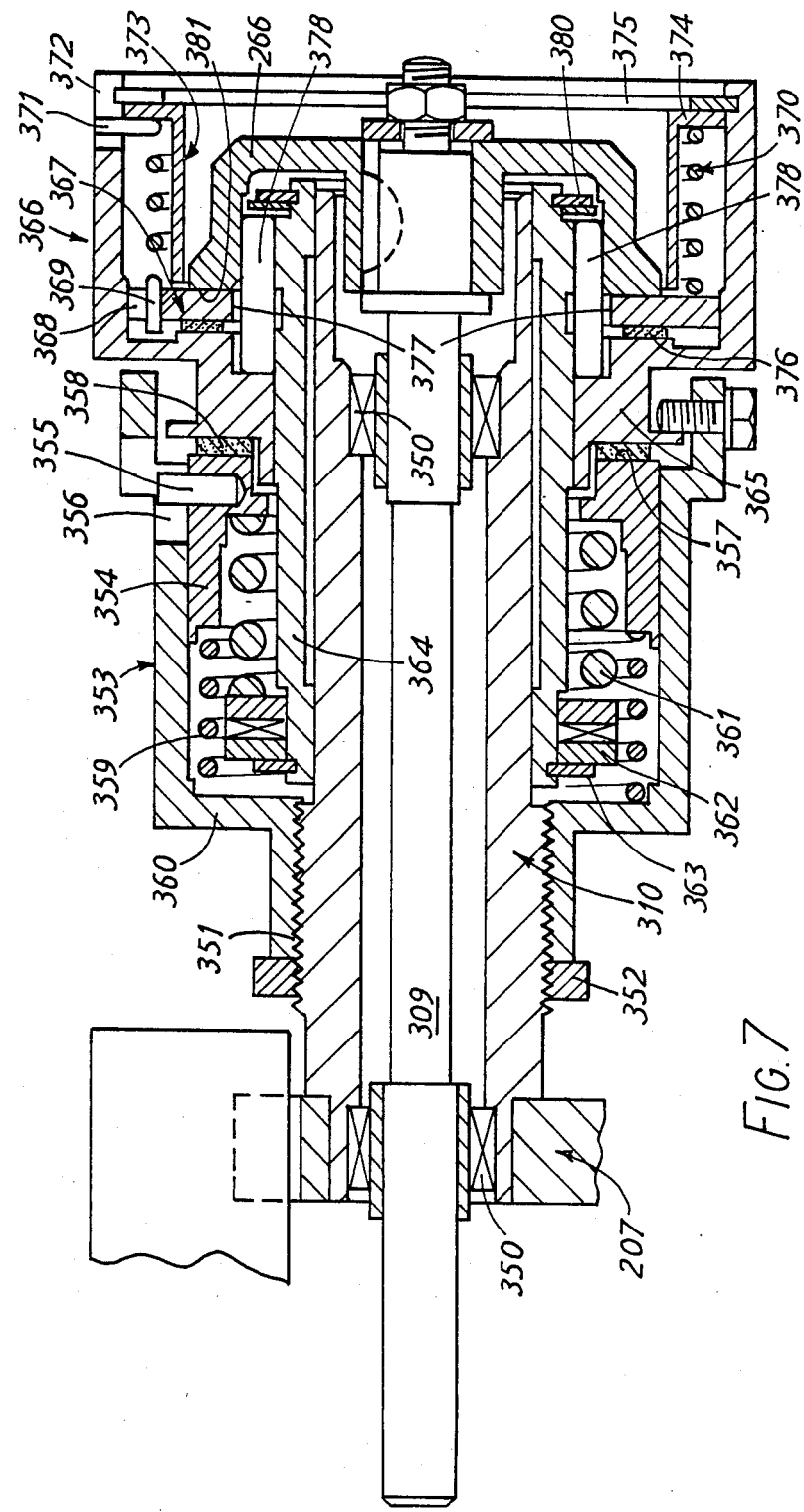

Embodiments of the present invention will now be described in greater detail, by way of example only, with reference to the accompanying drawings of which:

FIG. 1 is a longitudinal cross-sectional view of one form of actuator,

FIG. 2 is a longitudinal generally half-section, view of a second form of actuator, FIG. 3 is a diagrammatic longitudinal cross-sectional view of a third form of actuator, FIG. 4 is a diagrammatic longitudinal cross-sectional view of a fourth form of actuator shown, also diagrammatically, incorporated into a railway braking system, FIG. 5 is a longitudinal cross-sectional view in more detail, of a fifth form of actuator, FIG. 6 shows a sixth form of actuator FIG. 7 shows an alternative detail for the actuator of FIG. 6.

Figure 8:
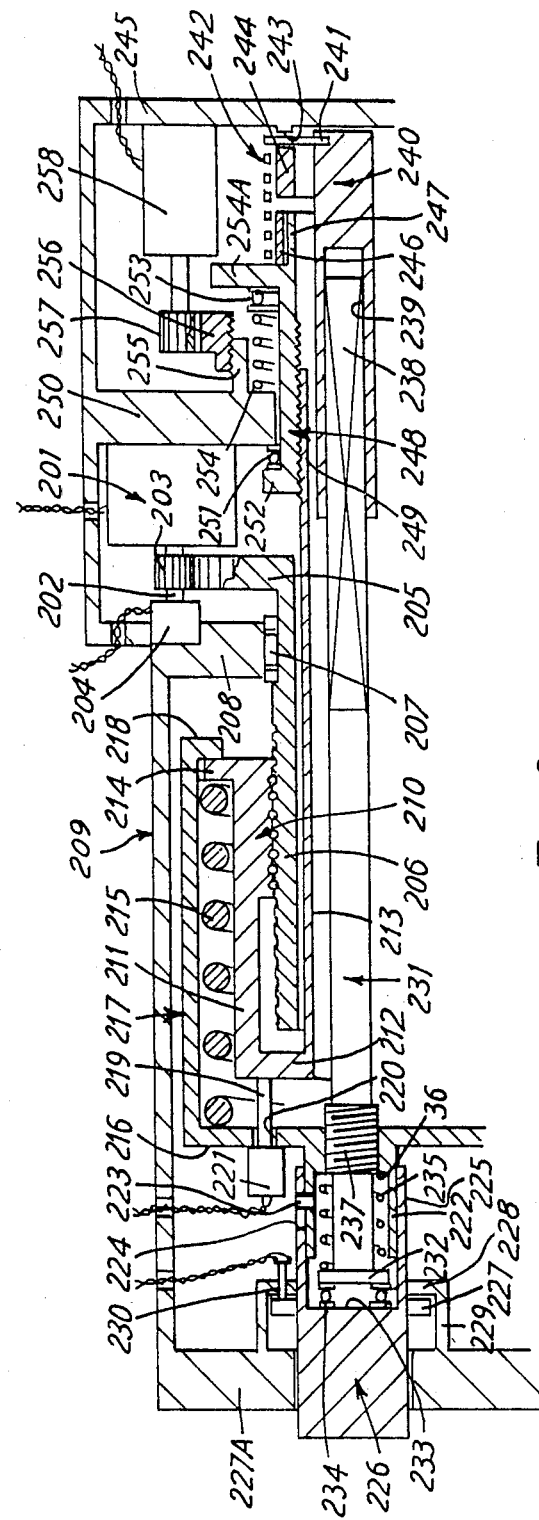
Figure 9:
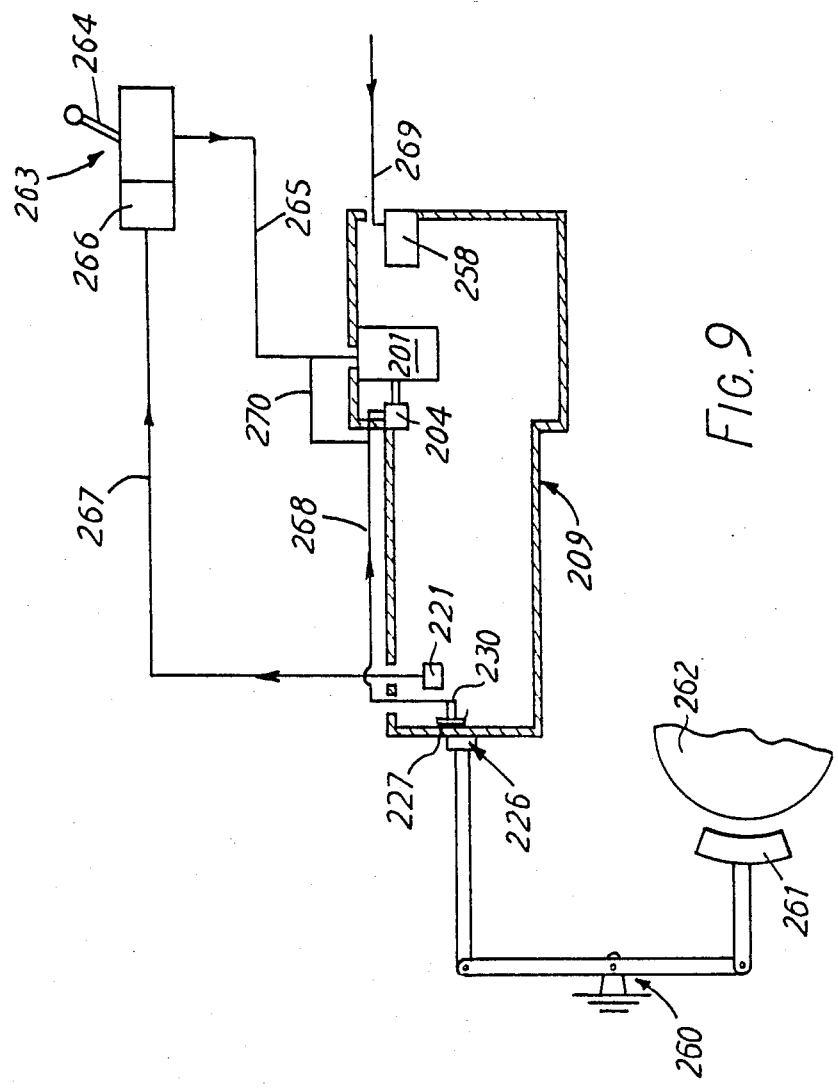
Figure 10:
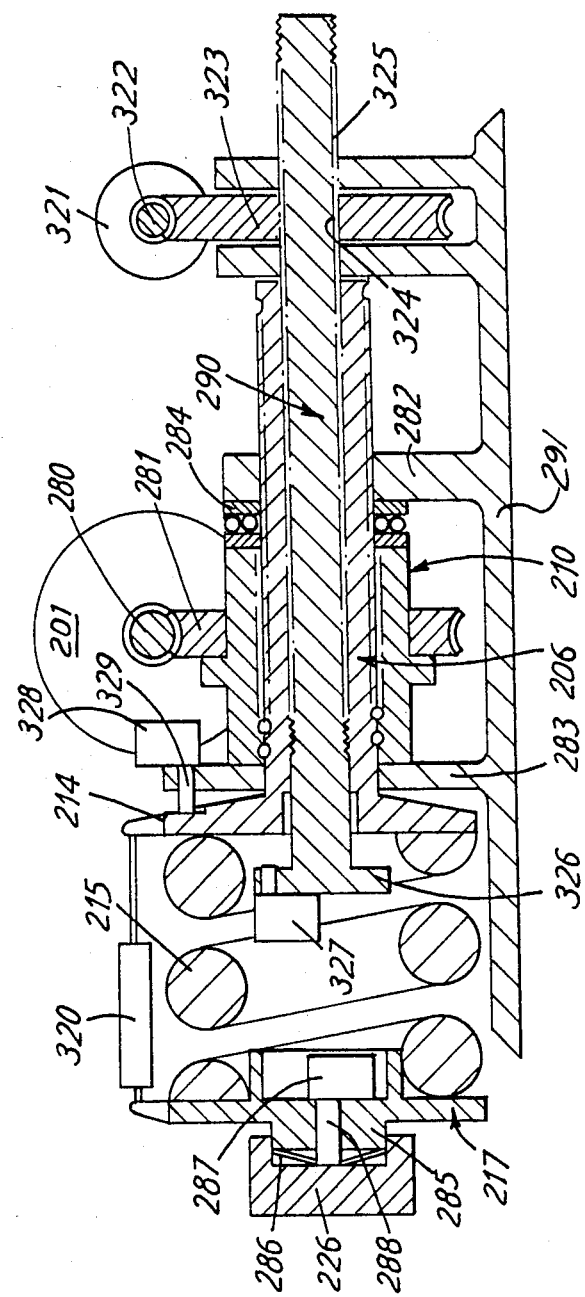
Figure 11:
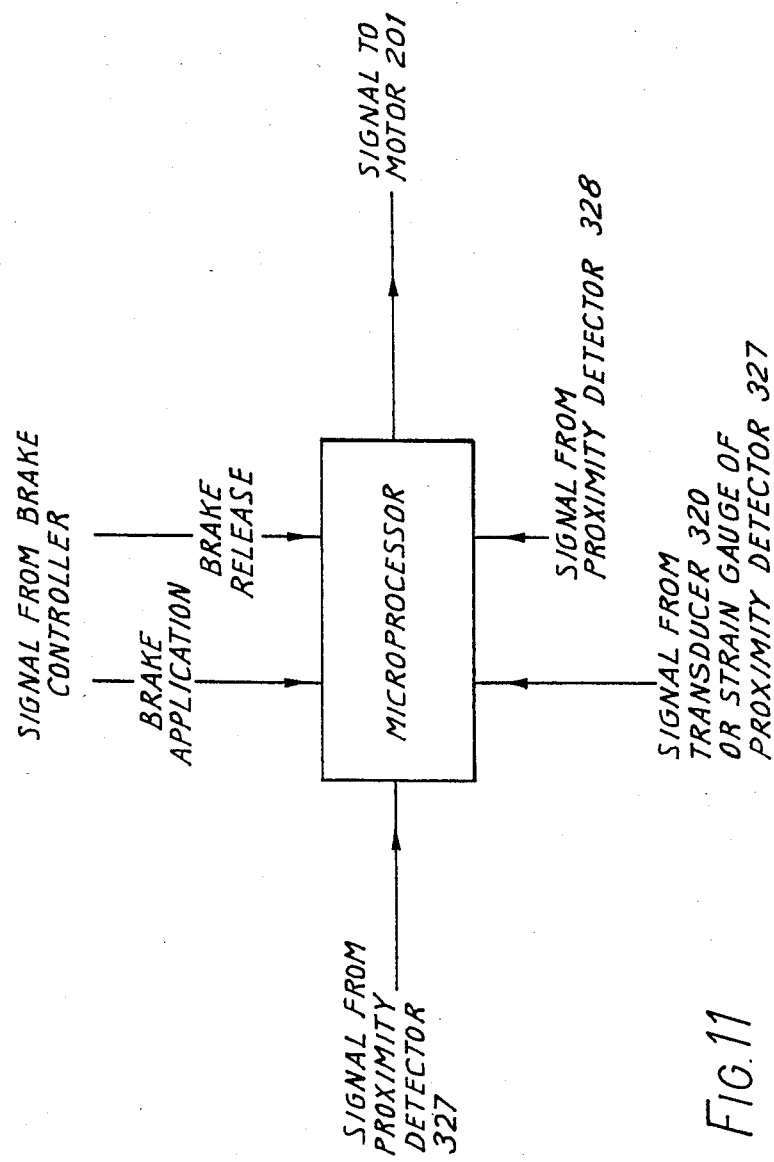
Figure 12:
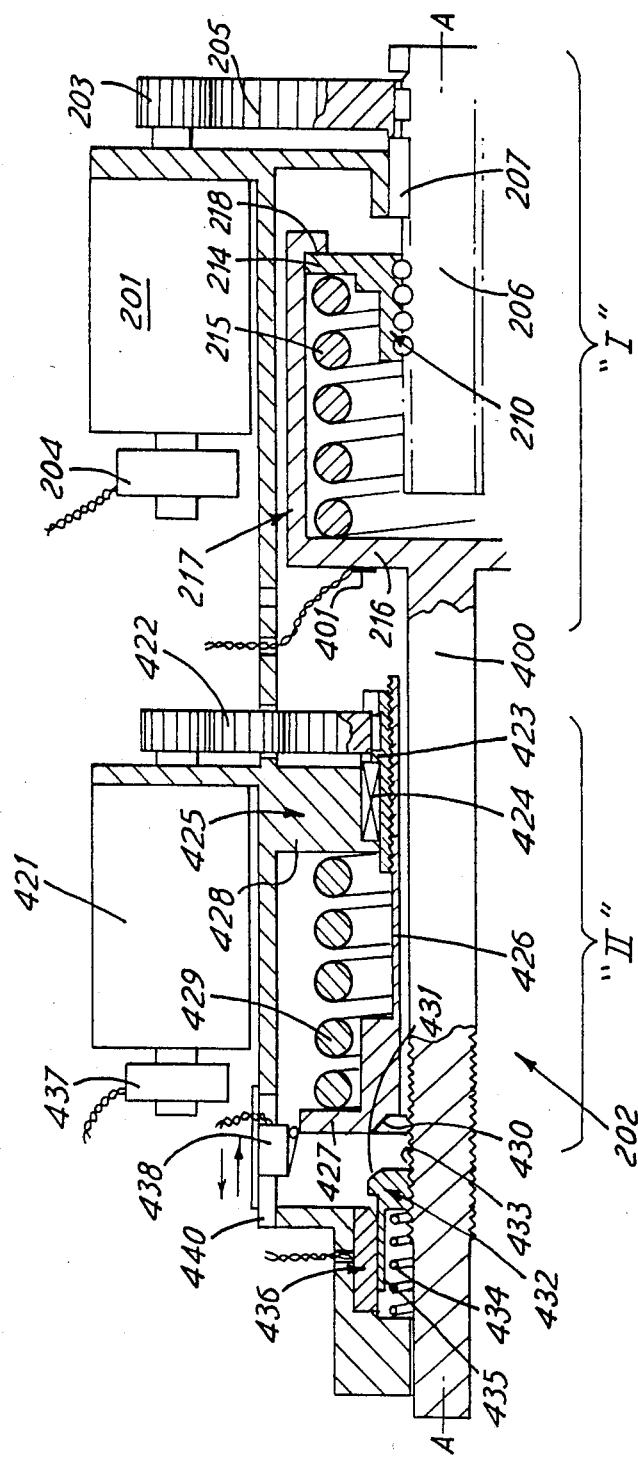
Figure 13:
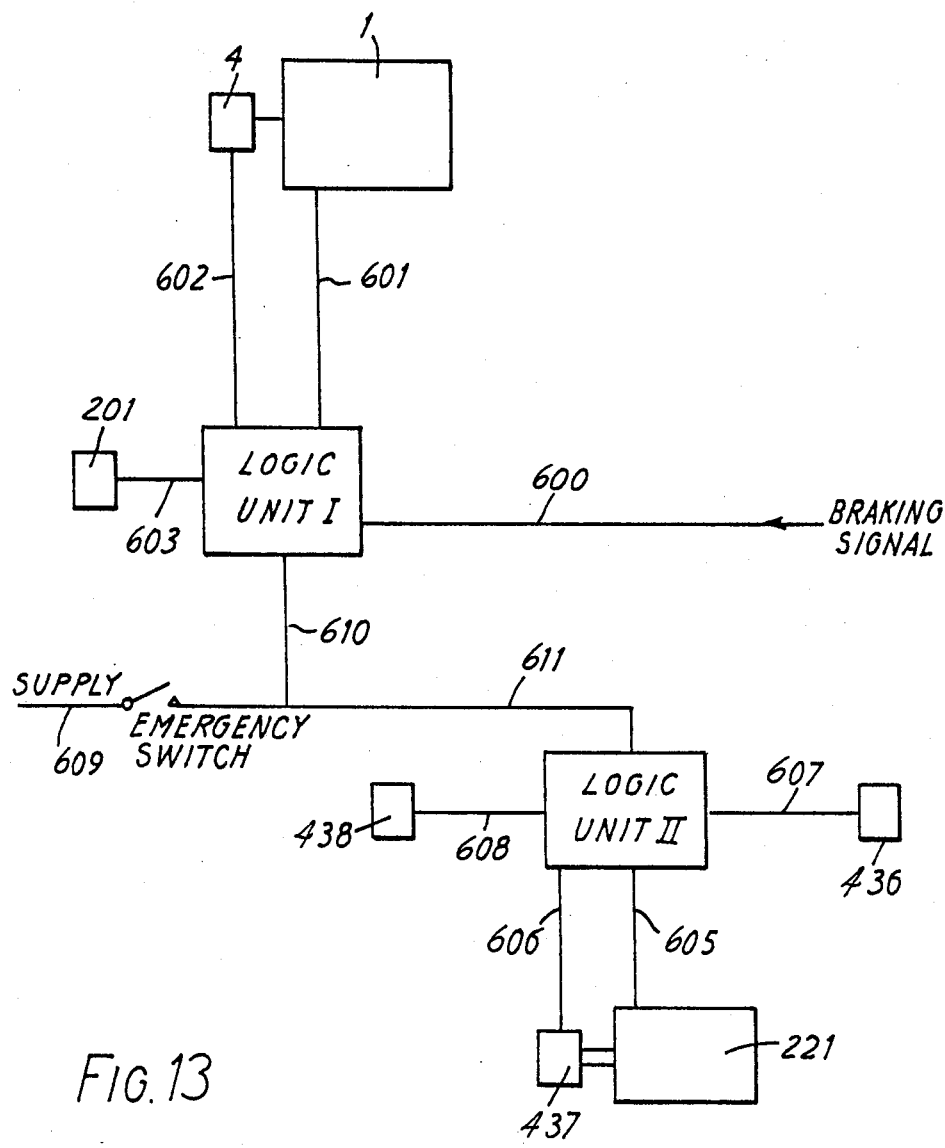

FIG. 8 is a longitudinal, generally half-section, view of a seventh form of actuator, FIG. 9 shows the electrical control circuit of the actuator of FIG. 8 shown, diagrammatically, incorporated into a railway braking system, FIG. 10 shows a diagrammatic longitudinal cross-sectional view of an eighth form of actuator, FIG. 11 shows the electrical control circuit for the actuator of FIG. 10, and FIG. 12 shows a diagrammatic longitudinal cross-sectional view of a ninth form of actuator tandem-arranged with an additional electric actuator, and FIG. 13 shows diagrammatically an electrical circuit for the control of the embodiment of FIG. 12.

The following embodiments of the invention will all be described in the context of railway brake actuators. It will, however, be understood that the concepts incorporated in the following described embodiment can equally well be used in brake actuators for other forms of vehicles. Indeed, they are applicable also to brake actuators for other forms of rotating machinery or, generally, to actuators for generating a force for other than braking usage.

Referring to FIG. 1, the force-exerting actuator has a power spring 1 which extends between an intermediate wall 2 of a housing 3 of the actuator and a flange 4 carried on the end of an output member 5. Extending axially from the flange 4 is a cylindrical extension 6 which lies co-axially with the power spring 1 and, at its end remote from flange 4, has a radially inwardly projecting second flange 7.

Trapped between the second flange 7 and a radially outwardly projecting flange 8 on a nut 9, is a control spring 10. The nut 9 is threadedly engaged with a ball-screw 11 which is in the form of a sleeve which passes through the wall 2 of the housing 3. Secured to the end of the ball-screw sleeve 11 on the opposite side of the wall 2 from the nut 10, is a gear 12 meshed with a pinion 13 arranged to be driven by an electric stepping motor 14.

As so far described, the actuator operates as follows:

The actuator is shown in FIG. 1 in its "release" position. In this position, the control spring 10 is sufficiently compressed that it exerts on the flange 7 a sufficient force totally to balance the force exerted by the power spring 1. Thus, the power spring 1 is prevented from exerting any force on the output member 5. From this position, the stepping motor 14 can be operated to rotate pinion 13 and, therefore, through gear 12, the ball-screw sleeve 11 in such a direction as to wind the nut 9 towards the left (as viewed in FIG. 1). Such movement of the nut 9 will allow the control spring 10 to expand and thus reduce the force which it exerts on the power spring 1. By such reduction, the detraction which the control spring 10 makes from the force exerted by the power spring 1 is reduced and the power spring 1 thus is freed to exert on the output member 5 a force which is the difference between the total force of which the power spring 1 is capable of exerting and the reduced force which the control spring 10 exerts in opposition to the power spring 1. It will thus be seen that, by controlling the operation of the stepping motor 14, the nut 9 can be positioned to control the force exerted by the control spring 10 and, therefore, the residual force allowed to be exerted by the power spring 1 on the output member 5.

In the context of railway braking equipment, the electric motor 14 would be controlled to determine the degree of braking required to be effected and this determined degree would be effected by the output member 5 being arranged to be operative on the braking members of the brake equipment.

One characteristic sometimes required, in railway braking equipment, is that the maximum braking force allowed to be exerted shall be dependent on the loading of the railway vehicle. The facility to provide for this requirement is provided in the actuator of FIG. 1 by the following parts:

Passing through the ball-screw sleeve 11 is a shaft 20 which, at its left-hand end as seen in FIG. 1, has a cup-shaped flange 21, and, adjacent its right-hand end, has a threaded portion 22. Engaged with the portion 22 is a second nut 23 integral with a gear wheel 24 meshed with a pinion 25, and arranged to be driven by a second electric stepping motor 26. The motor 26 is arranged in a suitable electric circuit to be operated to an extent dependent upon the load of the vehicle on which the actuator is used. Variable operation of the motor 26 in dependence upon the load will, through pinion 25, gear wheel 24 and second nut 23 variably axially position the flange 21. The flange 21 being located in the axial path of the nut 9, the flange 21 will act as an adjustable stop variably to limit the maximum movement of the nut 9 and, therefore, the minimum value which the control spring 10 is allowed to detract from the force exerted by the power spring 1. Thus, the maximum residual force allowed to be exerted by the power spring 1 on the output member 5 (and, therefore, the maximum braking force which can be exerted) is controlled in dependence upon the loading of the vehicle.

At least in certain railway braking contexts, the above described simple actuator suffers a major disadvantage. Because there is no provision for taking up the slack before the springs become operative to exert an output force on the output member, the springs would have to be such as to allow of their extension to take up such slack. The next described actuator has such a provision and allows for the slack to be taken up before the springs are allowed to be operative to exert the output force.

Referring to FIG. 2, the right-hand half of the actuator is, in all essentials, substantially identical to the actuator of FIG. 1 and like reference numerals are used for like parts. These parts of the actuator operate in exactly the same manner as the like parts of the actuator of FIG. 1 and, therefore, here require no further description. The only point of difference between the two actutors in these parts is that the shaft 20 in the FIG. 2 embodiment is tubular for a reason which will become more apparent hereinafter.

The left-hand end face of the output member 5 is formed with a clutch face 30 engageable with a complementary clutch face 31 on a nut 32. The periphery of the nut 32 is formed as a gearwheel 33 meshed with a pinion 34 arranged to be driven by a third electric motor 35. Carried by the nut 32 in the region of the gearwheel 33 is a bearing 36 by which the nut 32 can rotationally engage a radially inwardly projecting wall 37 of the housing 3.

The nut 32 is urged to the right by a spring 38 effective between the nut 32 and a thrust bearing 39 carried by the housing 3.

The nut 32 is threadedly-engaged with a reversible thread with a tubular member 40 which co-axially houses a spring 41 effective between the left-hand end face 42 of the cup-shaped flange 21 on the shaft 20 and a radially inwardly-projecting flange 43 of the tubular member 40. The tubular member 40 carries a pin 44 which projects into an axially extending slot 45 in a tubular final output member 46.

The left-hand end of the final output member 46 is closed by an end face 47 which carries a further thrust race 48 resiliently engaged with a flange 49 which is trapped between the thrust race 48 and a spring 50 extending between the flange 49 and the flange 43 of the member 40. The flange 49 is formed on the end of a shaft 51 which passes through the actuator and, particularly, through the tubular shaft 20. Towards its left-hand end, the shaft 51 has a threaded portion 52 which is threadedly engaged with the internal periphery of the flange 43 of the tubular member 40. Adjacent its right-hand end the shaft 51 has a squared portion 53 slidably engaged by a complementary-shaped squared tube 54. At its right-hand extremity, the tube 54 carries an operating arm 55 arranged to control operation of a mechanical clutch 56 of the stepping electric motor 14. Positioned so as to be engaged by the operating arm 55 are a pair of electrical contacts 57.

The actuator of FIG. 2 operates in the following manner:

The actuator, which is a railway brake actuator, is shown in FIG. 2 in the "brake-released" condition. In this condition, the clutch 56 is "made" to prevent rotation of the stepping motor 14 and the control spring 10 is thus held compressed equally to hold compressed the power spring 1. There is, therefore, no output force exerted by these combined springs on the output member 5 as is explained above in relation to the FIG. 1 embodiment. Also, the integral clutch in the electric motor 35 is energised thereby holding the nut 32, the tubular member 40, the final output member 46 and the shaft 51 all in their positions as shown in FIG. 2.

To apply the brakes, the integral clutch in the electric motor 35 is de-energised and thereby released. Such release of this clutch allows the spring 41 to extend taking with it the tubular member 40 (spinning the nut 32 on its bearing 36 through the threaded engagement of the member 40 with the nut 32), the final output member 46 (through the spring 50, flange 49 and thrust bearing 48) and the shaft 51 (by its flange 49 being trapped between the spring 50 and the thrust bearing 48). Such movement of all of these parts will continue until the brakes are engaged. When such engagement occurs, the final output member 46 will be unable to travel any further. As the member 46 cannot now move any further, the spring 41, being the stronger, will compress the spring 50. To effect this, the shaft 51 will be rotated on the thrust bearing 49 by virtue of the threaded engagement of the flange 43 with the threaded portion 52 of the shaft 51. In such compression of the spring 50, the tubular member 40 can move axially of the final output member 46 by virtue of the pin-and-slot 44/45 connection between these two members.

Rotation thus caused of the shaft 51 causes the squared tube 54 similarly to be rotated. This rotation of the squared tube 54 causes, firstly, the clutch 56 to be freed thus to free the motor 14 for operation and, secondly, by making the contacts 57, energises the motor 14. In the manner above described with reference to FIG. 1, the motor 14 can now be operated to reduce the force exerted by the control spring 10, thus reducing the detraction which this spring 10 makes from the force exerted by the spring 1. Thus, the differential force is exerted on the output member 5 which is first moved to engage the clutch 30/31 and, thereafter, the force exerted on the output member 5 is transmitted through the nut 32, the tubular member 40, its flange 43, the threaded portion 52 of the shaft 51, the flange 49 of the shaft 51, and the thrust bearing 49, to the end face 47 of the final output member 46. Thus, a braking force determined by the degree of operation of the stepping motor 14 is impressed on the final output member 46 and the previously-engaged brakes.

Subsequently to release the brakes, the stepping motor 14 is first operated to re-compress the control spring 10. Such re-compression will, as above described with reference to FIG. 1, remove the braking force exerted on the output member 5 and will disengage the clutch 30/31. In this process, the nut 32 will be restored to its position in which its thrust bearing 36 re-engages the wall 37 of the housing 3 carrying back with it the tubular member 40 and the final output member 46 as the previous stretch in the brake rigging recovers under relaxation of the previously-applied braking forces. When all the braking force has finally been relieved by the above actions, the spring 43 is freed to re-expand. This re-expansion of spring 43 rotates the shaft 51 in the direction opposite to which it had been rotated during the brake application causing, through the squared tube 54 and the operating arm 55, the contacts 57 to be broken and the clutch 56 to be re-made. Hence, further operation of the motor 14 is prevented and the parts of the actuator controlled by the electric motor 14 are locked in their "brakes released" condition. The breaking of the contacts 57 also causes a pre-determined degree of operation of the electric motor 35. Such operation rotates the nut 32 and, thereby, moves the tubular member 40 a predetermined axial distance to the right. Through the pin-and-slot connection 44/45, such movement of the member 40 carries with it the final output member 46 to give a pre-determined brake clearance. The axial movement of the members 40 and 46 in this setting of the brake clearance, re-compresses the spring 41.

The parts of the actuator have now all been returned to a "brakes released" condition with a pre-determined amount of brake clearance. Hence, it will be seen that the right-hand parts of the actuator are also, effectively, a slack adjuster for, irrespective of whatever may have been the degree of wear of the brakes in successive brake applications, the brake clearance is always adjusted during a brake-release operation to a pre-determined value.

Should there be an electric-power failure, a brake application is automatically effected. De-energisation of the integral clutch of the motor 35 will allow the spring 41 to apply the brakes. Thereafter, the clutch 56 will be "broken" upon collapse of the spring 50 and the clutch 30/31 "made" (both in the manner above described) so that the spring arrangement 1/10 is clutched to the final output member 46 to allow the exertion of braking forces.

It will be noted that the motor 26, pinion 25, gearwheel 24, tubular shaft 20 and flange 21 provide the facility for load limitation of the maximum braking forces allowed in exactly the same way as is described with reference to FIG. 1.

Referring now to FIG. 3, there is here illustrated an actuator suitable for operation of railway disc-brake equipment. Some of the parts are the equivalency of the parts shown in the embodiment of FIG. 1 and for such parts, the same reference numerals are used in the two embodiments.

The actuator of FIG. 3 includes the power spring 1 and the control spring 10. The power spring 1 is operative between the intermediate wall 2 of the housing (not shown in totality in FIG. 3) and the flange 4 of the output member 5. The control spring 10 is operative between the second flange 7 on the output member 5 and a nut 9 threadedly engaged with a reversible screw thread on a ball-screw shaft 11.

Carried by the flange 4 of the output member 5 is a brake pad 40 engageable with a brake disc 41.

At its end opposite from the nut 9, the ball-screw shaft 11 carries a slotted disc 42 the periphery of which provides the gearwheel 12 meshed with the pinion 13 arranged to be driven by the electric motor 14.

As thus far described, the actuator of FIG. 3 operates in the same manner as that of FIG. 1 in that, in the "brake released" condition shown in FIG. 3, the control spring 10 is held fully compressed and overcomes the force exerted by the power spring 1 thus holding the brake pad 40 out of engagement with the brake disc 41. Operation of the electric motor 14 will "let out" the control spring 10 and, thereby, reduce the force which it exerts in opposition to the power spring 1. By variably operating the electric motor 14 to vary the detractive force exerted by the control spring 10, the residual force exerted by the power spring 1 on the output member 5 can be varied to produce the required braking force exerted by the brake pad 40 on the brake disc 41.

To lock the electric motor 14 in any desired position of its operation, is a pawl 45 operable under the control of a solenoid 46 to engage between the teeth of the pinion 13. The pawl 45 is loaded by a spring 47 normally to be out of engagement with the pinion 13, energisation of the solenoid 46 driving the pawl 45 into between the teeth of the pinion 13 against that spring loading.

Located adjacent the slotted disc 42 is a slotted Hall-effect switch 50 which measures the degree of rotation of the disc 42.

Carried by the output member 5 is a first microswitch 48 which lies in the path of the nut 9. A second microswitch 49 carried by the intermediate wall 2 lies in the path of the output member 5 in its direction of travel to release the brakes.

This FIG. 3 embodiment operates in the following manner:

The actuator is shown in FIG. 3 in its "brakes released" condition and in this condition the solenoid 46 will have been energised to engage the pawl 45 with the pinion 13 and thus hold the motor 14 and slotted disc 42 in a position in which the control spring 10 is held compressed sufficiently fully to overcome the power spring 1. Thus the output member 5 will have been retracted and the brake pad 40 held out of engagement from the brake disc 41.

From this "brakes released" condition, an electrical control signal is first generated to indicate the required degree of braking. The generation of this control signal will first de-energise the solenoid 46 so that the spring 47 will withdraw the pawl 45 from engagement with the pinion 13. The release of pinion 13 then frees, through the gearwheel 12, the slotted disc 42 and the shaft 11 for rotation. Freeing the shaft 11 for such rotation, allows the control spring 10 to expand driving the nut 9 to the left. At the same time, expansion of the control spring 10 reduces the force which it exerts in opposition to the power spring 1 thus allowing the spring 1 to expand driving the output member 5 to the left to bring the brake pad 40 into engagement with the brake disc 41.

When the brake pad 40 is engaged with the brake disc 41, the output member 5 is prevented from any further leftward movement and the power spring 1 from any further extension. However, the control spring 10 is not so inhibited and it will continue to expand. Shortly after the brake pad 40 engages the brake disc 41, the continuing expansion of the control spring 10 will carry the nut 9 to engage the microswitch 48. Operation of the microswitch 48 generates a signal to cause the slotted Hall-effect switch 50 to start measuring the rotation of the disc 42. Clearly, the rotation of the disc 42 is a measure of the axial movement of the nut 9 which is, itself, a measure of the expansion of the control spring 10. In so far as the expansion of the control spring 10 is indicative of the reduction of the force which it exerts in opposition to the power spring 1 and, therefore, an indication of the residual force exerted on the output member 5 by the power spring 1 and, consequently, the braking force being exerted by the brake pad 40 on the brake disc 41, the rotation of the disc 42 is an indirect measurement of the braking force being exerted. The output signal from the slotted Hall-effect switch 50 is therefore compared with the original electrical signal generated to indicate the required degree of braking. When this output signal indicates a degree of braking just short of that indicated as required by the original electrical circuit, the solenoid 46 is energised to prevent any further extension of the control spring 1. The control spring 1 will thus be brought to a halt at a point which will result in the required degree of braking. Should the solenoid 46 have been energised too early or too late so that the nut 14 "undershoots" or "overshoots", this will be seen by the switch 50 and the solenoid 46 and the motor 14 operated accordingly. When the switch 50 "reads" the rotation of the disc 42 as indicative of the braking force being that required, the solenoid 46 is energised to engage the pawl 45 with the pinion 13 and thus "lock-in" that required degree of braking.

Should a variation in the required degree of braking now be indicated by variation of the original electrical signal, the pawl 45 will again be released and the electric motor 14 energised, if appropriate, to vary the degree of braking to bring it into accord with the variation to the electrical signal.

To release the brakes, the electrical signal is suitably revised. Such revision will, again, first cause the pawl 45 to be released from engagement with the pinion 13 and, thereafter, the motor 14 energised. Energisation of the motor 14 will now, through the pinion 13 and the gearwheel 12, rotate the shaft 11 to "wind-back" the nut 9 and re-compress the control spring 10. Initial re-compression of the spring 10 will increase the force detracted by it from that exerted by the power spring 1, thus reducing the braking force being exerted between the brake pad 40 and the brake disc 41. When this braking force has been substantially wholly reduced, continued compression of the control spring 10 will pull the brake pad 40 away from the brake disc 41. Just prior to the brake pad 40 leaving the brake disc 41, the nut 9 will also leave the microswitch 48. Thereafter, the motor 14 is continued to be operated for a predetermined amount (again, measured by the slotted Hall-effect switch 50) to provide the required clearance between the brake pad 40 and the brake disc 41.

It will be observed, of course, that any electrical power failure will result in a full brake application as loss of power will result in the pawl 45 being retracted from the pinion 13 by the spring 47 with the motor 14 remaining de-energised. Hence, the control spring 11 can fully expand to allow the totality of the force exertable by the power spring 1 to be applied as a braking force to the output member 5.

It will have been noted that, so far in the description of the operation, no mention has been made of microswitch 49. Spring-applied brake actuators conventionally have a manual release facility. It will be seen that the microswitch 49 is positioned beyond the normal "brake release" condition of the actuator. After a manual release, the control spring 10 will need to be compressed beyond its normal fully compressed condition so that the power spring 1 is, equally, more than fully compressed. The function of the microswitch 49 is to detect when the two springs 1 and 10 have been sufficiently over-compressed as to permit re-setting of the manual release.

Referring to FIG. 4, there is here illustrated another form of actuator incorporated into railway disc brake equipment. Again, like reference numerals are used for like parts in the preceding embodiments.

The actuator again includes the power spring 1 and the control spring 10. The power spring 1 is operative between (in this case) the end wall 2 and the flange 4 of the output member 5. The control spring 10 is operative between (in this case) the flange 4 and the nut 9 which, in this embodiment, is extended into a disc-like form being slidable within the housing 3 but being held from rotation relative thereto by a key 61 which rides in a slot 62 in the interior wall of the housing 3. The nut 9 is threadedly engaged on the ball-screw shaft 11.

At its end remote from the nut 9, the shaft 11 has a socket 63 of square cross-section which receives the squared-end 64 of the output shaft 65 of the electric motor 14.

As so far described, the actuator of this embodiment operates exactly as those of the preceding embodiments in that:

in the "brake released" condition of the actuator as shown in FIG. 4, the control spring 10 is fully compressed so as to overcome the force exerted by the power spring 1 and thus ensuring that there is no residual output force applied to the output member 5, and to apply the brakes, the motor 14 is freed to rotate by the de-energisation of the latch 68. This permits the control spring 10 to expand thus reducing the detractive force exerted by it and, consequently, allowing an increasing residual force to be exerted by the power spring 1 on the output member 5.

In this embodiment, the shaft 11 has integral with it a disc 66 which has a toothed-periphery 67 engageable by a solenoid-operated latch 68. This latch 68, in its de-energised state, frees the shaft 11 for rotation and, in its energised state, locks the shaft 11 against rotation. The latch 68 is, of course, de-energised when the motor 14 is operated to rotate the shaft 11.

It will be seen that the disc 66 is supported for rotation on thrust bearing 69.

At its end remote from the disc 66, the shaft 11 is provided with a splined extension 70 which engages a similarly-splined axial bore 71 in a member 72. The member 72 provides a re-entrant flange 73 between which and a flange 74 at the end of a tubular extension 75 of the nut 9 is a further thrust bearing 76. Thus, on the one hand, the member 72 can rotate with the shaft 11 and, on the other hand, it can move axially with the nut 9.

Positioned in the path of axial movement of the flange 73 of the member 72, is a collapsible stop 77 the end face 78 of which facing the flange 73 constitutes a clutch face.

The above-described construction provides for limiting the maximum output force which can be exerted by the actuator, particularly, although not only, in an "emergency application" of the brakes.

From the "brakes released" condition of the actuator as shown in FIG. 4 in which the motor 14 will be de-energised and the latch 68 energised to lock the shaft 11, "emergency application" is effected merely by de-energising the latch 68. Without the motor 14 energised, de-energisation of the latch 68 frees the shaft 11 to be rotated. As it was the locking of shaft 11 which previously held the control spring 10 fully compressed, releasing shaft 11 allows the control spring 10 to extend. Such extension of the control spring 10, as in a "service" brake application, allows the residual output force to be applied to the output member 5.

Extension of the control spring 10 will also drive the nut 9 to the left, the shaft 11 (now being freed to rotate by release of the latch 68) being thereby forced to rotate. Rotation of the shaft 11, similarly rotates member 72 through the splined connection of the shaft 11 with the member 72. However, movement of the nut 9 to the left will move the member 72 axially to the left in addition to its rotation imparted by the shaft 11, by the interconnection of the nut 9 with the member 72 through the tubular extension 75, the flange 74, the thrust bearing 76 and the flange 73 on the member 72. The flange 73 will thus be carried into engagement with the collapsible stop 77 the clutch face 78 of which, being engaged by the flange 73, will prevent further rotation of the member 72 and thus the shaft 11. Such prevention of any further rotation of the shaft 11, prevents further axial movement of the nut 9 and, therefore, any further extension of the control spring 10. Thus, by the positioning of the stop 77, the minimum force can be set which the control spring 10 is allowed to detract from the power spring 1. Hence, the maximum residual output force allowed to be exerted on the output member 5 is determined by the positioning of the stop 77.

It will be noticed that the driving of the shaft 11 by the nut 9 in this way, will exert an axial loading to the left on the shaft 11. Hence, the inclusion of the thrust race 69.

It will also be noticed that apart from effecting an "emergency application" by positive de-energisation of the solenoid latch 68, such an application will automatically be effected should there by an electrical power failure.

As shown in FIG. 4, the above described actuator is suitable for operation of a railway vehicle's disc brakes.

The output member 5 is arranged to operate a final output member 80. Between these two members may be inserted some form of manual-release means 81 by which the final output member 80 can be released independently of the actuator.

The final output member 80 is pivotally connected at 82 to a lever 83 itself pivotally connected at 84 to a tension bar 85. The tension bar 85 is, in turn, pivotally connected at 86 to one of a pair of calliper levers 87/88. The levers 87/88 carry the brake pads 89.

Clearly, any movement of and force exerted by the output member 5 is transmitted to the brake pads 89. Micro-switches 48 and 49 are again, provided, they having the same functions as the similarly-referenced micro-switches in the embodiment of FIG. 3.

The above described embodiment has a particular advantage over the previously-described embodiments. If a load-limited brake application is being made, whether as an "emergency application" or otherwise, this will be a particularly heavy brake application with likely consequential greater wear of the brake pad or block. Whilst a slack adjuster may be incorporated, this will not deal with the brake wear as it occurs during a particular brake application but will merely adjust for such wear which occurs during one application before the next is made. In the previous embodiments it will be seen that the element which sets the maximum limit of a brake application (the cup-shaped flange 21 in FIGS. 1 and 2) constitutes a fixed "land" once it has been positioned. With these embodiments, because of this arrangement, should there be any appreciable wear of the brake members during a load-limited brake application, the value of the brake application will rapidly fall-off with such wear. This will be so for the following reason: as the brake wears, the output member 5 will further extend under the influence of the power spring 1 to accommodate such wear. Not only will, therefore, the residual force applied through the output member 5 drop with the consequential extension of the power spring 1 but, much more significantly, because the flange 8 of the nut 9 not be "grounded" on the flange 21, the power spring 1 in extending will have to compress the control spring 10. Now, the control spring 10 is far higher rated than the power spring 1 (typically, in the ratio of 20:1) so in compressing the control spring 10, its detractive force will substantially be re-increased with consequential substantial reduction of the residual force applied to the output member 5.

In contrast to this situation, it will be seen that, in the FIG. 4 embodiment, the collapsible stop 77 is carried by the flange 4 of the output member 5 and, therefore, the stop 77 moves with the output member 5. With this arrangement, assuming a load-limited brake application and wear of the brake during the application, as the brake wears, the power spring 1 will, again, extend to accommodate that wear. However, with this arrangement of FIG. 4, such extension of the power spring 1 will dis-engage the clutch face 78 from the member 72. Such dis-engagement will free the member 72 (and, therefore, the ball-screw shaft 11) for rotation. Such rotation will occur as the nut 9 is now freed for axial movement under the influence of the control spring 10. Thus, whilst the initial extension of the power spring 1 in accommodating the wear had tended to compress the control spring 10, such compession will not, in fact, occur because the control spring 10 is free to compensate for such tendency by further axially displacing the nut 9. Hence, the two springs 1 and 10 will remain balanced to generate a residual force exerted on the output member 5 which is determined by the load setting of the collapsible stop 77 irrespective of the position of the output member 5 as it moves with increasing wear of the brake.

Turning now to FIG. 5, there is here shown a more practical construction which embodies the concepts of the embodiment of FIG. 4 and like references are here used for like parts in the embodiment of FIG. 4.

The actuator shown in FIG. 5 has, again, the power spring 1 and the control spring 10. The power spring 1 is operative between the end wall 2 of the housing 3 and a flange 4 of the output member 5. From the flange 4 extends, to the left as viewed in FIG. 5, a tubular extension 100 co-axial with the output member 5. At its left-hand end the tubular extension 100 is provided with a further radially-inwardly extending flange 101 against which bears one end of the control spring 10. It will thus be seen that the flange 4, the extension 100 and the flange 101 are the equivalency of the flange 4 in FIG. 4. The other end of the control spring 10 abuts a nut 9 threadedly-engaged on a threaded shaft 11.

The shaft 11 extends leftward of the nut 9 to pass through bearings 102 wherein it is rotatably supported by being pinned at 103 to a flanged tube 104 the flange of which is supported on a thrust bearing 105. The flange of the tube 104 carries an electro-magnetic brake or clutch 106 arranged to be driven by the electric motor 14 through a belt-and-pulley drive 107.

The tubular extension 100 has on its internal face an axially-extending slot 108.

Into the slot 108 extends a pin 109 carried by a disc 110 which is urged into face-to-face engagement with a flange 111 on the nut 9 by a spring 112. On the side of the disc 110 remote from the flange 111, is a thrust bearing 113 which rotatably supports a cup-shaped member 114 keyed at 150 to the shaft 11 for rotation therewith. Splined to the right-hand end of the shaft 11 is a member 72 the end face 115 of which is engageable (upon rightward movement of the member 72) with the clutch face 73 of a collapsible stop 77.

The clutch face 73 is carried by a clutch member 116 which is resiliently loaded by a spring 117 to abut a circlip 118 carried by a housing 119. The housing 119 has an axially-extending slot 120 through which passes into the slot 108 in the tubular extension 100, a pin 121 carried by the clutch member 116. On its side remote from the spring 117, the housing carries a co-axial domed stud 123. It will be seen that the left-hand periphery of the housing 119 is abutted by the spring 112 which thus extends between the housing 119 and the disc 110.

The stud 123 abuts a cam surface 124 on a wedge 125 which is threadedly-engaged with a shaft 126 arranged to be driven by a second electric motor 127. The wedge 125 is keyed at 128 to an end cap 129 which is secured to the output member 5. Hence, it will be seen, operation of the motor 127 will drive the wedge up and down (as viewed in FIG. 5) relative to the output member 5.

The end cap 129 has therein a co-axial dogged bore 130, the dogs of which can be interdigitated with corresponding dogs on a closed tube 131. From the open end of the tube 131 radially extends, outside of the housing 3, a manually-operable lever 132.

Abutting the end wall of the closed tube 131 is a ball-ended shaft 133 which is secured to a fork 134 between and to the prongs of which is pivotally connected the lever 135 of a conventional slack adjuster 136. The slack adjuster 136 is mounted on a bracket 137 dependent from the actuator housing 3. The operation of the above described actuator is much as that of the actuator shown in FIG. 4.

In brief: to apply the brake of a vehicle to which the actuator of FIG. 5 is fitted, the electric motor 14 is operated to rotate shaft 11 and, thereby, through nut 9, allow the control spring 10 to expand. Such expansion of the control spring 10 reduces the force which it exerts in opposition to the power spring 1 and thus the output force exerted on the output member 5 by the power spring 1 increases. This increase of the output force firstly moves the output member 5 to the right (as viewed in FIG. 5) similarly moving with it through its end cap 129, the shaft 133 to rotate the slack adjuster 136 on its mounting on bracket 137 and thereby to apply the brake. After the brake has applied, the braking force exerted thereby will increase with continued operation of the motor 14 further decreasing the detractive force exerted by the control spring 10.

To effect the required degree of braking, the electric motor 14 may carry an encoder such as a Hall-effect switch by which the rotation of the motor is measured and which is compared with an input signal indicative of the required degree of braking to arrest further rotation of the motor 14 when that rotation is indicative of the allowed extension of the control spring 10 necessary to effect that required degree of braking.

To release the brakes, the operation of the electric motor 14 is reversed.

To effect limitation of the maximum permitted degree of braking, the second electric motor 127 is operated to an extent determined by the load of the vehicle. Such operation will, consequently, vertically position the wedge 125 equally in dependence upon that load. Such positioning of the wedge 125 will equally axially position the clutch housing 119 thus spacing the clutch face 73 from the end face 115 a distance which also corresponds to the load of the vehicle.

Hence, if a degree of braking called-for which exceeds the permitted maximum for the load of the vehicle, before the called-for level of baking is achieved, the end face 115 of the member 72 will engage the clutch face 120. This engagement will arrest the rotation of the shaft 11 and thereby prevent any further rightward movement of the nut 9 with consequential prevention of any further expansion of the control spring 10. Thus, any further increase in the braking force is prevented. To effect manual release of the brake, the lever 132 is operated to allow the normally end-abutting dogs on the tube 131 and the end cap 129 to interdigitate and, therefore, the power spring 1 to be "earthed" to release the brake. To effect reset after a manual brake application, the electric motor 14 is operated in its "release" direction past its normal "release" position to overcompress the power spring 1 and allow the dogs to revert to their normal end-abutting positions.

After the above described operation of load-limiting of the braking force the clutching of the end face 115 to the clutch face 73 might prevent reverse rotation of the shaft 11 to effect release of the brake. To obviate this possible situation, a free-wheel or one-way rotary clutch may be inserted at 140 between the shaft 11 and the member 72. This arrangement would be such that the member 72 is driven by the shaft 11 as it rotates to move the member 72 into engagement with the clutch face 73 but the shaft 11 is free to rotate relative to the member 72 when the shaft 11 rotates in the reverse direction to move the member 72 away from the clutch face 73.

The embodiment of FIG. 5 may include the switch 49 of FIG. 4 to determine the degree of operation of the electric motor 14 which provides the overcompression of the power spring 1 sufficient for reversion of the dogs to their normal position. This switch may, conveniently, be positioned between the end wall 2 and the flange 101 of the output member 5. The embodiment of FIG. 5 may also include the switch 48 of FIG. 4, this switch, conveniently, being located between the flange 101 and the disc 110 so as to measure the degree of compression/extension of the control spring 10.

Referring now to FIG. 6, wherein, again, like reference numerals are used for like parts in the previously-described embodiments, the actuator has power spring 1 (in the form of a pair of co-axial springs 1A and 1B) and the control spring 10. In this embodiment, the control spring is in the form of a series of springs circumferentially arranged around the tubular output member 5.

The power spring 1 extends between the intermediate wall 2 of the housing 3 of the actuator and a flange 4 carried by the output member 5. The control spring 10 extends between a second flange 7 on the output member 5 and a pressure plate 300. On the reverse side of the pressure plate 300 from the control springs 10 is a thrust race 301 co-axial with the output member 5. The thrust race 301 lies between the pressure plate 100 and a gear wheel 302 formed on its face opposite to that against which bears the thrust race 301, with a cam face 303. Under the effect of the control springs 10, the cam face 303 resiliently bears against a roller 304. The gearwheel 302 is arranged to be driven through spur gears (generally indicated by numeral 305) by the electric motor 14.

As so far described, it will be seen that the residual output force generated on the output member 5 is determined in the same manner as in the previously-described embodiments. The spur gears 305, the cam face 303 reacting on the roller 304, the gearwheel 302 and the pressure plate 300 collectively operate to permit the electric motor 14 variably to compress the control spring 10 in a fully comparable way to that in the previous embodiments. Again as with the previous embodiments, the control spring 10 effective on the output member 5 exerts a force which is detractive from the force exerted by the power spring 1 on the output member 5. Hence, the motor 14 is operable to determine the residual force exerted on the output member 5.

The shaft 65 of the electric motor 14 is coupled to a shaft 306 which carries near its right-hand extremity a disc 66 the periphery of which is toothed at 67 and is engageable with a solenoid-operated latch 68. This arrangement operates in exactly the same way as the similarly-referenced parts in the embodiment of FIG. 4 to allow for the locking and un-locking of the control springs 10 exerting any particular force on the output member 5.

Means similar to those in the embodiment of FIG. 4 are provided for determining the maximum residual force to be exerted on the output member 5 in an "emergency application". These means include the collapsible stop 77 together with its cluch face 78. In this case, the clutch face 78 is engageable with the left-hand face of the disc 66. It will be seen in FIG. 5 that the shaft 306 passes through the pressure plate 300 and, whilst rotatable therein, is secured for axial movement therewith by the plate 300 being sandwiched between on one side, circlip 307 and, on the other side, a bearing 308 the outer race of which is pinned at 309 to the shaft 306. Thus, when the plate 306 has moved a sufficient distance to reduce the detractive force allowed to be exerted by the control springs 10 to a desired minimum (and, therefore, the residual force exerted on the output member 5 to have reached a desired maximum) the disc 66 being rotated by the electric motor 14 operating to reduce the detractive force being exerted by the control spring 10, will be carried by the plate 300 into engagement with the clutch face 68 and will be braked thereby to prevent further rotation of the electric motor 14.

It will be seen that, because again the collapsible stop 77 is carried on the output member 5 as in the embodiment of FIG. 4, the arrangement of the embodiment of FIG. 5 offers the same advantage as the comparable arrangement of FIG. 4 in ensuring that wear of the brake does not result in an unacceptable reduction of the brake force in a load-limited brake application.

In this embodiment of FIG. 6, the collapsible stop 77 also provides for variable-load adjustment of the maximum residual force permitted to be exerted on the output member 5.

As has been observed above, in railway braking actuators it is frequently desirable to ensure that the maximum permitted braking forces are consistent with the load of the railway vehicle.

To achieve such control, the shaft 106 is rotationally supported in a threaded tube 310. The threaded tube 310 is engaged by a nut 311 carrying a pin 312 axially slidable in a slot 313 in the adjustable stop 77. Means (not shown) are provided for rotating the stop 77 together with the nut 311 to a degree dependent upon the load of the vehicle. Such rotation will cause axial movement of the 311 towards or away from, as the case may be, the disc 66. This movement of the nut 311 will carry with it the collapsible stop 77 under the influence of the spring 314 extending between the nut 311 and the end face of the stop 77. Thus, the spacing between the end clutch face 78 on the stop 77 and the disc 66 can be varied in accordance with the load of the vehicle. This will result in the maximum permitted rotation of the motor 14 and, therefore, the maximum residual force exertable on the output member 5 to be adjusted according to the load of the vehicle.

The micro-switches 48 and 49 of the embodiment of FIG. 4 are also provided in this embodiment.

There is provided, in this embodiment, a slack adjuster mechanism generally indicated by the reference numeral 315. This slack adjuster is of a well-known type and in so far as it forms no part of the present invention any detailed description of it is unnecessary in this Specification. This slack adjuster operates merely to ensure the maintenance of the desired clearance between the brake pads 89 and the brake disc 316. This it does by adjusting the extension of a final output member 46 by which the pads 89 are operated, relative to the output member 5 in the well-known manner. Extending from the slack adjuster 315 through the output member 5 is a tube 317 and a shaft 318 terminating at their right-hand end in manual adjustment means generally indicated by the reference numeral 319. Again, the construction and function of these parts are well-known and the only observation here needing to be made as to these parts is that they are provided to permit of manual release of the brake.

The operation of the embodiment of FIG. 5 is, in all essentials, similar to the operation of the embodiment of FIG. 4 so that no further description of its operation is here required.

FIG. 7 shows an alternative construction to that described with reference to and as illustrated in FIG. 6 for determining the maximum residual force emergency application.

A potential problem of the construction shown in FIG. 6 is that, upon the construction of FIG. 4 becoming operative to limit the maximum output force, the disc 66 (which, it will be seen, rotates with the shaft 309 at the speed of the electric motor 14) may engage the clutch face 78 with such force that it will jam so firmly on the clutch face 78 as not to be readily disengaged therefrom by reverse operation of the electric motor 14 to "release" the brakes. It has to be remembered that the disc 66 will engage the clutch face 78 under the rotational inertia of the combined disc 66, shaft 309 and rotating mass of the electric motor 14. Moreover, it will be seen that, once engaged and therefore having to some degree compressed the spring 314, the force of the spring 314 will be detracted from the force exerted by the control spring 10 thus increasing the residual output force exerted by the spring 1 on the output member 5. The braking force generated will thus suddenly be increased. Unless this increase is allowed for in the setting of the stop 77, there will be resultant overbraking.

The construction of FIG. 7 obviates these potential disadvantages.

Like reference numerals are used in FIG. 7 for like parts in FIG. 6.

In the FIG. 7 construction, the shaft 309 would be (as is the shaft of FIG. 6) connected for rotation with but axially slidable with respect to the output shaft of the electric motor 14. The shaft 309 is mounted for rotation in bearings 350 in a tube 310 secured by one end to the member 7. Over the portion 351 the tube 310 is threaded and, screwed onto this portion by one end and locked thereon by a lock-nut 352, is a housing 353.

Axially slidable within the housing 353 is a part 354 which carries a pin 355 projecting onto an axial slot 356 in the wall of the housing 353. On its front face 357, the part 354 carries a clutch annulus 358. Urging the part 354 to the right (as viewed in FIG. 7) is a very light spring 359 which acts between the part 354 and the end wall 360 of the housing 353, and a stronger spring 361 which acts between the thrust bearing 362 and the part 354.

The thrust bearing 162 is trapped between the spring 361 and a circlip 363 carried on one end of a tubular member 364 which is rotationally mounted on the tube 310. Secured on the tubular member 364 by its hub 165 is a drum-shaped member 366.

It will thus be seen that the springs 359 and 361 are effective to engage the clutch annulus 358 with the end of the hub 363 of the member 366 thus serving to tend to hold rotationally fixed relative to the tube 310, the two members 364/365.

Within the drum-shaped part of the member 366 is a loose-fitting annulus 367 which has a notch 368 into which projects one end 369 of a torsion/compression spring 370. The other end 371 of the, spring 370 is engaged in an axially-extending slot 372 in the drum-shaped part of the member 366. Co-axial with the spring 370 is a flanged tube 373 the flange 374 of which is trapped between the spring 370 and an internal circlip 375 carried by the member 366.

The annulus 373 is caused, by the spring 370, to abut a washer 376 of low-friction material (e.g. P.T.F.E.) carried on the member 366.

At its inner periphery, the annulus 367 has six notches 377 (of which only two can be seen in FIG. 7) through each of which projects a roller 378. The walls of the notches 377 are so shaped that the annulus 367, the rollers 378 and the tubular member 364 constitute a rotational one-way clutch. Rotation of the annulus 367 in one direction causes the rollers 378 to bind in their respective notches 377 to clutch the annulus 367 to the member 364. Rotation of the annulus 367 in the opposite direction causes the rollers 378 to roll out of binding engagement with the notches 377 and free the annulus for rotation relative to the tubular member 364.

The rollers 378 are axially trapped between the hub 365 of the drum-shaped member 366 and a circlip 380 carried on the right-hand end (as viewed in FIG. 7) of the tubular member 364.

Keyed to the shaft 309 at its right-hand end is the equivalent of the disc 66 of FIG. 6, a cup-shaped member 66 the edge face 381 of which is engageable (and shown engaged in FIG. 7) with the annulus 367.

The above described construction operates as follows:

In the "release" condition of the brakes there is a gap between the end face 381 of the member 66 and the annulus 367. This gap will have been set to represent the maximum permitted level of baking for the loading of the vehicle.

As a brake application is effected by operation of the electric motor 14 (FIG. 6), the shaft 309 will be rotated by the motor 14. Also the tube 310 will be moved to the right (as viewed in FIG. 7) by the member 7 in the same manner as above described with reference to FIG. 6. Such movement of the tube 310 will carry with it both the housing 353 and the member 166. Hence, the annulus 367 will also be carried to the right closing the previously-set gap between the annulus 367 and the end face 381 of the member 66.

When the electric motor 14 has been allowed to rotate to an extent sufficient to generate the maximum permitted level of braking, the gap between the annulus 367 and the end face 381 of the member 66 will have been fully closed and the annulus 367 moved into contact with that end face 381. The annulus 367 will, therefore, be "picked-up" by the rotating member 66 and will tend to be rotated with it against the spring 370, the annulus 367 being supported on the low-friction washer 376. The rotation of the annulus 367 will jam the rollers 378 between the notches 377 in the annulus 367 and the tubular member 164. This will cause the tubular member to tend to rotate with the member 66 and the annulus 367 but it will be prevented from doing so by the engagement of the hub 365 of the member 366 with the clutch annulus 358. Hence, the member 66 will be arrested in its previous rotation. Such arresting of the member 66 will prevent further operation of the motor 14 and, thus, any further increase in the generated braking force limiting that force to the maximum permitted by the original size of the gap between the annulus 367 and the end face 381 of the member 66.

In the slight continued rotation of the member 66 after initial engagement of its end face 381 with the annulus 367, whilst the annulus 367 is being "picked-up" and the various rotating parts brought to a halt, there will be some slight continued movement of the housing 353 to the right. It will be noted, however, that, in contrast to the arrangement of FIG. 6, such slight movement only compresses the very light spring 359. Hence, with this construction the spring force detracted from the control springs 10 is insignificant and does not, therefore, effect any disadvantageous increase in the generated braking force.

Referring to FIG. 8, the actuator comprises an electric motor 201 of which the output shaft 202 passes through a pinion 203 secured on the shaft 202, to an electrically-operated clutch 204. The pinion 203 is meshed with a gear wheel 205 secured to one end of a ball-screw tube 206 which is mounted for rotation in bearing 207 in an intermediate wall 208 of the actuator housing 209.

Threadedly engaged with the ball-screw tube 206 is a nut 210 having a leftwardly-extending tubular extension 211 at the right-hand extremity of which is a radially-inwardly projecting flange 212. From the inner periphery of the flange 212 extends rightwardly a tube 213 lying co-axially with the ball-screw tube 206.

Projecting radially outwardly from the end of the nut 210 remote from the tubular extension 211, is a second flange 214. The flange 214 is abutted by one end of a spring 215 the other end of which abuts the end wall 216 of a spring housing 217 which constitutes the output member of the actuator. The housing 217 has, at its end remote from the end wall 216, an inwardly-projecting flange 218. As can be seen from FIG. 1, the spring 215 is trapped in the housing 217 by the flange 214 on the nut 210 being trapped between the spring 215 and the flange 218 of the spring housing 217. Extending from the flange 212 on the nut 210 is a shaft 219 which passes through a bore 220 in the end wall 216 of the spring housing 217, to a transducer 221 mounted on that end wall 216. The transducer 221 measures the force exerted by the spring 215 by measuring its degree of compression as will be hereinafter seen.

The end wall 216 of the spring housing 217 is provided with an axially-projecting tubular extension 222.

The tubular extension 222 carries a pin 223 which extends into a slot 224 in a tubular extension 225 of a final output member 226. Hence, the pin 223 and the slot 224 constitute a pin-and-slot connection 223/224 between the two tubular extensions 222 and 225 which permits relative axial movement between the two whilst preventing relative rotation between them.

Surrounding the final output member 226 is a friction ring 227. This ring frictionally engages the member 226 but, under sufficient force, can be slid either way axially of the final output member 226. The friction ring 227 is housed between the end wall 216 of the actuator housing 209 and a flange 228 on the end of a tubular projection 229 which projects inwardly of the actuator housing 209. Hence, the degree of movement of the friction ring 227 is limited to between the end wall 227 and the flange 228. Should the final output member 226 be moved a greater distance than this limited movement, then the friction ring 227 being thereby caused to engage the end wall 227 or the flange 228, as the case may be it will be caused frictionally to slide on the final output member 226. Mounted in the flange 228 is a pair of electrical contacts 230 located so as to be "made" by the friction ring 227 when it abuts the flange 228.

Projecting co-axially within the tubular extensions 222 and 225 is one end of a shaft 231. At its extremity of this end the shaft 231 has a flange 232 between which and the internal face 233 of the final output member 226, is a thrust bearing 234. Also, extending between which and the internal face 233 of the final output member 226, is a thrust bearing 234. Also, extending between this flange 232 on the opposite side from the bearing 234, is a spring 235 of which one end abuts the flange 232 and the other abuts an internal end face 36 of the end wall 216 of the spring housing 217. By this spring 235, the shaft 231 is urged to the left to engage its flange 232 with the thrust bearing 234.

The shaft 231 passes through the end wall 216 of the spring housing 217 and is there threadedly engaged with the end wall 216 by means of the threaded portion 37 of the shaft 231.

The shaft 231 passes co-axially through the tube 213 of the nut 210 and, at its end portion 238 remote from its flange 232, is square in cross-section. The end portion 238 of the shaft 231 is received in a similarly cross-sectioned bore 239 in a clutch-operating part 240. This part 240 receives the tail 241 of a square-section wire spring 242, which passes through a circumferential slot 243 in a tubular boss 244 extending inwardly of the actuator housing 209 from its end wall 245. The spring 242 is wrapped-around a cluch part 246 so that the spring 242 and part 246 constitutes a one-way rotational clutch 242/246 by which the clutch-operating part 240 is clutched for rotation with the clutch part 246 for rotation therewith in one direction but is free to rotate relative to the clutch part 246 in the opposite direction.

The clutch part 246 is in the form of an internally-splined sleeve, the splines of which are interdigitated with corresponding splines on a hub 247 of a second nut 248. Thus, the clutch part 246 can move axially with respect to the nut 248 but is non-rotationally engaged therewith.

The nut 248 is threadedly-engaged with a threaded end portion 249 of the tube 213. The nut 248 is supported for rotation in a second intermediate wall 250 of the actuator housing 209 by a first thrust bearing 251 located between a flange 252 on the nut 248 and one side of the intermediate wall 250 and by a second thrust bearing 253 loated between a second flange 254A on the nut 248 and a spring 254 one end of which abuts the second bearing 253 and the other side of the intermediate wall 250 of the housing 209.

Surrounding the spring 254 is a threaded boss 255 projecting from the intermediate wall 250 and threadedly-engaged by an adjustable stop 256. The exterior wall of the stop 256 is toothed and engaged by a pinion 257 arranged to be driven by a second electric motor 258. It will be seen that operation of the electric motor 258 will adjust the stop 256 axially on the boss 255. The stop 256 is located to be in the path of and, therefore, to be abutted by, the flange 254A on the nut 248.

Referring now to FIG. 9 which shows the electrical circuit for controlling the actuator described above with reference to FIG. 8 being used as a railway brake actuator, the final output member 226 of the actuator is coupled, through a linkage mechanism 260 to a brake block 261 engageable with a railway vehicle wheel 262.

For controlling the brake block 261, there is a brake controller 263 operating the handle 264 of which generates over line 265 a signal indicative of the degree of braking required. This signal is fed to the electric motor 201. Fed back to a comparator 266 in the brake controller 263 over the line 267 from the transducer 221 is a signal indicative of the force being exerted by the spring 215 (FIG. 8).

The pair of contacts 230 are in the circuit 268 of the electrical clutch 204.

Applied over the line 269 to the second electric motor 258, is a signal indicative of the load of the railway vehicle.

The actuator shows in FIG. 8, controlled by its electrical circuit as shown in FIG. 9, operates as follows:

The actuator is shown in FIG. 8 in its "brakes released" condition.

In this condition, the motor 201 is de-energised and its clutch 204 energised by the "making" of the pair of contacts 230 being engaged by the friction ring 227. The second motor 258 will have been energised over the line 269 to an extent indicative of the load of the railway vehicle. Such energisation of the motor 258 will have rotated the nut 256 on the threaded boss 255 axially to position it, again, in accordance with the load of the vehicle.

In this condition of the actuator, the brake block 261 will be clear of the wheel 262 by the required amount of normal clearance.

Brake Application

To effect a brake application, the handle 264 of the brake controller is operated to a degree to indicate the degree of baking required. Such operation will generate on line 265 an electrical signal which, firstly, over line 270 will de-energise the clutch 204 and, secondly, will energise the electric motor 201.

De-energisation of the clutch 204 frees the motor 201 for rotation upon its energisation and such consequential rotation will, through pinion 203, rotate the ball-screw tube 206. Rotation of tube 206 will feed the nut 210 to the left (as viewed in FIG. 8) carrying with it the spring housing (or output member) 217 as, there being little resistance to movement of the housing 217, the effort of the spring 215 will cause the housing 217 axially to move with the nut 210. The housing 217 will also carry with it the final output member 226 and the shaft 231 as these parts will be held together with the spring housing 217 by the spring 235. The movement of the final output member 226 will, through the linkage 260, move the brake block 261 into engagement with the wheel 262.

During this movement of the housing 217, the nut 248 will be caused to rotate on its bearings 251 and 253 (being retained in its axial position as shown in FIG. 8 by the spring 254 as the threaded portion 249 of the tube 213 is drawn through the nut 248.

After the brake block 261 has engaged the wheel 262, resistance to further movement by all those parts previously involved will now suddenly increase as this engagement resists further movement of the final output member 226. As this member 226 tends to stop, continued operation of the electric motor 201 under the influence of the signal being fed over line 265 will, continue the movement of the nut 210. The final output member 226 being temporarily arrested in its movement, the consequent continued movement of the spring housing 217 will collapse the spring 235; the housing 217 being permitted to continue its movement relative to the final output member 226 due to the pin-and-slot connection 223/224 between the tubular extensions 222 and 225 respectively of the housing 217 and the member 226.

As the spring 235 collapses, the shaft 231 being prevented from further axial movement by the arresting of the final output member 226, the shaft 231 will be forced to rotate as the threaded engagement of the housing 217 is forced along the threaded portion 237 of the shaft 231. Rotation of the shaft 231, through its square section portion 238 engaged in the bore 239 of the clutch operating part 240 (which, previously, merely moved axially relative to that part 240) will rotate the clutch operating part 240. Such rotation causes the clutch 241/242/246 to arrest the rotation of the nut 248.

The braking force now starting to be exerted by the brake block 261 on the wheel 263 will build up as the motor 201 is continued to be operated. The continued rotation of the motor 201 will continue to "screw" the nut 210 to the left now to compress the spring 215 causing it to exert a growing output force on the spring housing 217 and, through the spring 235, on the final output member 226. As the spring 235 further compresses under this growing output force, the nut 248 (now being prevented by the clutch 241/242/246 from rotation) will be carried axially to the left with the tube 213 being free to do by virtue of the splined connection of the clutch part 246 to the hub 247 of the nut 248. Such movement of the nut 248 carries its flange 254A towards the stop 256.

The transducer 221 will be registering this growing output force and will be feeding back to the comparator 266 of the brake controller 263, a signal indicative of the value of the force. When this feed-back signal from the transducer is recognised by the comprator as being indicative of the braking force required as indicated by the degree of operation of the handle 264 of the brake controller, the comparator will terminate the signal previously applied over the line 265. Such termination will, firstly, energise the clutch 204 to "lock-in" the braking force being exerted and, secondly, de-energise the motor 201 to prevent any further increase of the braking force.

Clearly, from this "brake applied" condition of the actuator, the braking force exerted can be increased or reduced, by suitable further operation of the handle 264 of the braking controller. Such further operation, for increasing the braking force, will de-energise the clutch 204 and re-energise the motor 201 until the new and higher braking force is exerted and, for reducing the braking force, will merely de-energise the clutch 204 and energise the motor 201 in the reverse direction to allow the spring 215 to re-expand until the braking force (as detected by the transducer 221) has reduced to the new lower value whereupon the clutch 204 will be re-energised.

It has been assumed in the above-described operation that the braking force called for by operation of the controller has not exceeded that suitable to the loading of the vehicle. Were it to have been otherwise, before the called-for degree of braking had been effected, the flange 254A on the second nut 248 would have engaged the stop 256. Such engagement would have arrested the nut 248 at the permitted maximum level of braking force and, through the tube 213, would have prevented any further movement of the nut 210 and, therefore, any further compression of the spring 215. Hence, the maximum output force permitted to be exerted by the spring 215 on the final output member 226 would have been limited.

Brake Release

From the "brake applied" condition of the actuator, the brake is released by appropriate operation of the handle 264 of the brake controller 263. Such operation will, firstly, again de-energise the clutch 204 and, secondly, this time energise the motor 201 for operation in the opposite direction to that in which it was operated to apply the brake. Such reverse operation of the electric motor 201 will "wind-back" the nut 210 to the right thus, initially, allowing the spring 215 to recover until it is again housed by the spring housing 217 when the previously-applied braking force will have been fully recovered. In the process of such recovery, the spring 235 will also have fully recovered rotating the shaft 231 in the direction opposite to its previous rotation and, thereby, restoring the flange 254 to the position which it initially had spaced from the stop 256.

When the braking force has been fully relieved, the rigging spring normally incorporated in the lever system 260 will assist the return of the brake block 261 to its normal clearance from the wheel 262. This will occur as the final output member 226 is withdrawn to its original position, through the pin-and-slot connection 223/224, as the housing 217 is moved back to the right under the influence of the now housed spring 215, by continued rightward movement of the nut 210 as the ball-screw tube 206 continues to be rotated by the motor 201. During this further movement, the shaft 231 will also be returned to the right. However, once the spring 235 has fully recovered upon the braking force been fully relieved, such movement of the shaft 231 is purely axial as there is now no relative movement between the spring housing 217 and the shaft 231. Such mere axial movement of the shaft 231 is accommodated by the square-section end portion 238 of the shaft 231 sliding in the bore 239 in the clutch-operating part 240. Hence, there is no further rotation of part 240 during this phase of the recovery and, therefore, no further axial movement of the second nut 248. The axial movement of the nut 210 relative to the second nut 248 is accommodated by the second nut 248 spinning on its bearings 251 and 253 as the tube 213 of the nut 210 is forced through the second nut 248.

All the above described "brake release" movements continue until the friction ring 227 is moved back by movement of the final output member 226, to "remake" the pair of contacts 230. Upon this occurring, the clutch 204 will be re-energised to "lock" the actuator in the "brakes released" condition and the motor 201 de-energised to cease its operation.

Slack Adjustment

In the above described operations, it was assumed, as stated, that the original clearance between the brake block 261 and the wheel 262 was that required.

Had this clearance, in fact, been in excess of the required, the following would have occurred:

During the "brake application", because the clearance was greater than that required, the friction ring 227 would have engaged the end wall 227A of the housing 209 before the brake was fully applied. This being so, once the ring 227 was arrested from further leftward movement by this engagement, the continued movement of the final output member 226 would have forced that member 226 through the ring 227 by an extent indicative of by how much the clearance was excessive. Hence, upon the "brake release" operation, as this operation is terminated by the "remaking" of the pair of contacts 230 by their engagement by the friction ring 227, at the end of the "brake release" operation, the clearance between the brake block 261 and the wheel 262 would be restored to that required.

It will be seen, therefore, that the gap between the friction ring 227 and the end wall 227A of the actuator housing 209 is a measure of the required total stroke of the actuator.

Referring now to FIG. 10 the actuator comprises an electric motor 201 which, through a worm 280, is arranged to rotate a worm-wheel 281. The worm-wheel 281 is secured to a nut 210 which is threadedly-engaged with a ball-screw tube 206 which is rotatably-supported in a pair of walls 282 and 283 upstanding from a base plate 291. Between the wall 282 and the nut 210 is a thrust bearing 284.

The ball-screw tube 206 has, at its left-hand end, a flange 214 between which and a cup-shaped output member 217 extends a spring 215.

As so far described, it will be appreciated that if the motor 201 is energised in one direction, the nut 210 will be rotated relative to the ball-screw tube 206 axially to move that tube 206 to the left. Rotation of the motor 201 in the opposite direction will, equally, axially move the tube 206 to the right. Leftward movement of the tube 206 will, through the spring 215, move the output member 217 to the left. Should the output member 217, at any point, be prevented from such leftward movement, then the spring 215 will be compressed by continued operation of the motor 201 and thus caused to generate a growing output force on the output member 217 with the continued operation of the motor 201. From such a condition in which the motor 201 has compressed the spring 215 to cause it to generate the output force, reverse operation of the motor 201 will, firstly, reduce the output force being generated and, thereafter, allow the output member 217 to be moved back to the right with the spring 215.

Carried on a boss 285 of the output member 217 is a final output member 226 between which and the end face of the boss 285, is a belleville washer 286. Mounted on the interior of the output member 217 is a transducer 287 the detecting rod 288 of which projects through the base 285 and the belleville washer 286. The transducer 287 is thus arranged to detect compression of the belleville washer 286.

If the actuator is, therefore, arranged so as to exert a force on some part (not shown) which is normally axially spaced from the final output member 226, it will be seen that, as the final output member 226 is moved to the left by suitable operation of the motor 201 to effect the movements above described, the combination of the belleville washer 286 and the transducer 287 will allow detection of when the final output member 226 engages the part concerned. Conversely, in the reverse movement, the combination of the belleville washer 286 and the transducer 287 will allow detection of when the final output member 226 is about to leave the part concerned.

In this embodiment, the motor 201 may conveniently be a stepper motor operable to rotate the nut 210 in discrete steps thus effecting compression of the spring 215 equally in steps so that it is caused to generate on the output member 217 an output force which also increases in steps.

To measure the value of the output force being generated, there is arranged in parallel with the spring 215 a transducer 320 which generates a signal indicative of the degree of compression of the spring 215. In an alternative, the transducer 287 may not merely be responsive only to the compression and recovery of the belleville washer 286 for the purpose described above with refernce to the embodiment of FIG. 3, it may additionally incorporate a strain gauge by which the strain experienced by the final output member 226 in the transmission of the output force is measured. With such arrangements, either of the transducers 320 or 287 will give signals indicative of the value of the output force being generated on the output member 217 by the spring 215.

In this embodiment, the axial position of the shaft 210 is adjusted in accordance with the load of the vehicle by a second stepper motor 321 which, through a worm 322, is arranged to drive a worm-wheel 323. The worm-wheel 323 is threaded in its axial bore 324 and is thereby, threadedly-engaged with a screw-threaded portion 325 on the shaft 290.

At its end remote from the portion 325, the shaft 290 is provided with a flange 326 which carries a proximity-detector 327.

The above-described arrangement serves as a load-limiting arrangement to ensure that the braking does not exceed that which is acceptable for the load of the vehicle. To achieve this load-limited braking characteristic, the second stepper motor 321 is, prior to a brake application, operated to an extent consistent with the load of the vehicle. This will axially position the flange 326 (and, therefore, the proximity-detector 327) to a position indicative of the load of the vehicle. If, now, a brake application is made by the energisation of the motor 201, the ball-screw tube 206 will axially be moved to the left to compress the spring 215 and thus cause it to exert a braking force in the manner above described with reference to FIG. 3. Should a braking force be demanded which is higher than that permissible with the particular load of the vehicle, before that demanded degree of braking is achieved, the flange 214 of the ball-screw tube 206 will engage the stem of the proximity detector 327 so actuating it and immediately terminating any further increase in the braking force by de-energising the motor 201 and terminating further compression of the spring 215.

A further proximity detector 328 is provided which, by engagement of its stem 329 by the rear face of the flange 214 on the ball-screw tube 206, can detect when the ball-screw tube 206 is fully retracted. This detector 328 may be employed when it is required fully to retract the brake block to replace it, the motor 201 then being energised to operate it in the "brake released" direction beyond any normal clearance of the brake block with the wheel until the detector 328 is operated.

The above described actuator is controlled by electrical circuitry incorporating a microprocessor as illustrated in FIG. 11. From a suitable brake controller (such as that shown in FIG. 6), the microprocessor can be fed with either a "brake application" signal or a "brake release" signal, the "brake application" signal being suitably modified to indicate the degree of braking required to be exerted. A signal from the transducer 320 or the strain gauge of the proximity detector 327, is also fed to the microprocessor which constantly monitors this signal and compares it to the "brake applicaion" signal. Upon receiving a "brake application" signal, the microprocessor generates a signal to the motor 201 causing it to be energised in a direction to apply the brakes. As the braking force generated by the spring 215 on the output member 217 inreases by continued operation of the motor 201 compressing the spring 215, the signal from the transducer 320 or the detector 327 will continuously vary accordingly. When this varying feed-back signal is found by the microprocessor to equate with the degree of braking demanded by the "brake application" signal, the output signal to the motor 201 will be terminated. Hence, operation of the motor 201 ceases, and the desired degree of braking is "locked-in" by the worm-and-worm-wheel drive 280/281. Should, prior to such equation, the proximity switch 327 be operated (indicating that the demanded degree of braking exceeded that permissible for the load of the vehicle), the microprocessor will immediately terminate further operation of the motor 201.

In a "brake release" operation, the brake controller will feed a "brake release" signal to the microprocessor. This will cause an output signal to the motor 201 to operate it in the reverse direction to move the ball-screw tube 206 to the right (as viewed in FIG. 9). Such movement of the tube 206 will allow the spring 215 to recover thus reducing, eventually to zero, the braking force previously exerted on the output member 217 by the spring 215. When the braking force is, in fact, reduced to zero, this is indicative that the brake block is about to leave the wheel. At this point, the belleville washer 286 will recover and the proximity detector 287 will be operated so to indicate. The microprocessor will then receive a signal from the detector 217.

Upon receipt of the signal, the microprocessor will allow continued operation of the motor 201 to a predetermined extent; that extent being pre-determined to give a nomal clearance between the brake block and the wheel.

Instead of the microprocessor being programmed for this "over-run" of the motor 201 to effect the normal clearance, the flywheel arrangement described above with reference to the FIG. 3 embodiment may be used.

Referring now to FIG. 12, it is in some contexts (and, particularly, some railway braking systems) to have a separate "stand-by" spring-applied brake actuator for use for "emergency applications." In the embodiment of FIG. 12, such a spring-applied brake actuator is shown in combination with an actuator constructed in accordance with the present invention. As can be seen, the two actuators are arranged in tandem, the actuator "I" being the normal "service application" actuator constructed in accordance with the present invention and actuator "II" being the spring-applied "emergency application" actuator.

For the actuator "I", like references are used for like parts in the embodiments previously described. This actuator comprises an electric motor 201 which, through pinion 203 and gearwheel 205, drives a ball-screw shaft 206 mounted in a bearing 207 in the actuator housing 209.

This spring housing 217 has an axially-extending shaft 400 the free end of which is connected to the brake operated by the system. Hence, the shaft 400 will be moved with the housing 217 to bring the brake into engagement with the railway-vehicle wheel (both not shown).

As the motor 201 is continued to be operated, the shaft 400 and the spring housing 217 now being prevented from further movement by engagement of the brake with the wheel, the nut 210 will start to compress the spring 215 and exert an increasing braking force.

To determine that the braking force exerted is that which is required, the end wall 216 is fitted with a strain gauge 401. By this gauge 401 the force exerted through the spring 215 can be measured by measuring the strain being exerted by the spring 215 on the end wall 216. When the braking force being exerted is detected as being that required, the electrical circuit of the system energises the electric clutch 204 to lock the actuator "I" and to switch off the motor 201.

The electrically-controlled spring-applied brake actuator "II" also has an electric motor 421 which, through gearing 422, is arranged to rotate an internally-threaded tube 423 mounted in a bearing 424 in a housing 425 on which is carried the motor 421. As will be seen from FIG. 9, the housing 425 is a onepiece construction with the housing of the actuator "I".

The tube 423 is threadedly engaged with an externally threaded tubular member 426 having at its end remote from its thread, a radial flange 427. Housed between this radial flange 427 and a radially inwardly projecting end wall 428 of the housing 425, is a brake-force applying spring 429.

The flange 427 has, towards its centre, a conical face 430. A complementary conical face 431 is provided on a nut 432 which is threadedly engaged with a reversible thread on a threaded portion 433 of the shaft 400 of brake-force applying member 217 which, it will be seen, is common to both actuators "I" and "II". The flange 427 and the nut 432 thus constitute clutch members of which the respective faces 430 and 431 constitute clutch faces interengageable by movement of the nut 432 to the right (as viewed in FIG. 12).

The nut 432 can be moved to the right by a spring 434 which is tending to spin the nut 432 along the threaded portion 433 of the output member 400. To control the nut 432, it has a leftward (as viewed in FIG. 12) tubular extension 235 which constitutes the armature of a solenoid 436.

Like actuator "I", the actuator "II" also has an electric clutch 437 by which the shaft of the motor 421 can be locked to hold the tubular member 426 in any desired position.

The actuator "II" above described operates in the following manner:

In the brake released condition as shown in FIG. 12, the motor 421 has previously been operated to drive (through gearing 422 and tube 423) the tubular member 426 to the right as viewed in FIG. 9. This will have compressed the brake-force applying spring 429 which will have been and will continue to be held in that condition by energisation of the electric clutch 437, which locks the tubular member 426 in the position shown in FIG. 9. After such locking, the motor 421 will have been de-energised.

Solenoid 436 will then have been energised to hold the nut 432 in its position shown in FIG. 12.

If, from this condition, a brake application is required, the solenoid 436 is first de-energised. This frees the spring 434 to spin the nut 432 up the threaded portion 433 of the shaft 400 of the output member 217 until its clutch face 431 engages the clutch face 430 in the tubular member 426. Shortly after the de-energisation of the solenoid 436, the electric clutch 437 is also de-energised. This, in unlocking the tubular member 426, allows the brake-force applying spring 429 to extend and, through the engaged clutch faces 430 and 431, to move the shaft 400 of the output member 217 to the left (as viewed in FIG. 12) to engage the brake with the vehicle wheel (both not shown). After such engagement, the spring 429 exerts a braking force on the brake.

The potential problem of the compounding of a "service brake application" effected with the actuator "I" with an "emergency brake application" effected with the actuator "II", is avoided with the above described equipment by an electrical circuit which ensures that the motor 201 and electric clutch 204 of actuator "I" cannot be energised whilst the solenoids 436 and electric clutch 437 of actuator "II" are de-energised.

The actuator "II" further includes a micro-switch 438. This micro-switch is for the purpose of limiting the maximum applied braking force exerted by the spring 429 by limiting the compression of that spring.

In railway vehicles particularly where the loaded-to-tare weight ratio is high, if the maximum brake-applying force exertable by the spring 429 were sufficient to effect an emergency stop of a fully-loaded vehicle, a dangerous situation might arise were the same force to be allowed to be exerted when the vehicle was empty or less than fully loaded. The micro-switch 438 measures the extension of the spring 429 and, therefore, the force exerted by the spring 429 on the shaft 400 of the output member 217 when it is clutched thereto and the spring 429 is freed for extension from the position of the microswitch 438. The micro-switch 438 is adjustable in position in the direction (left/right as viewed in the drawing) of extension of the spring 429.

The micro-switch 438 is positioned such as to be engaged by the flange 427 of the nut 430. The switch 438 is movable along the length of a slot 440 provided in the housing 425, the slot 440 extending in the same direction as that of the extension of the spring 429.

From a fully-extended condition of the spring 429, as the motor 421 is operated to compress the spring 429, when the flange 427 reaches the micro-switch 438, this switch will be operated, firstly to discontinue operation of the motor 421 and, secondly, to operate the clutch 437 to "lock" the nut 430 in the position in which its flange operated the micro-switch 438.

If, therefore, the micro-switch 438 has been positioned along the slot 440 in dependence upon the load of the vehicle, the spring 429 will now have been pre-set to exert a force which is equally dependent upon the load of the vehicle. Thus, when the actuator "II" is operated as above described, the force exerted by the spring 429 on the shaft 400 and, therefore, the braking force exerted thereby, will also be dependent on the loading of the vehicle.

To simplify the setting arrangement for reductions in load, the motor 421 can be arranged to let the spring 429 out to a "tare" position when the vehicle is stationary and then compress the spring 429 up to a required "load" position.

A suitable electric circuit to effect such control is shown in FIG. 13.

A circuit indicative of the required degree of braking is fed to Logic Unit I over line 600. Through the Logic Unit I, over line 601 the energisation of the motor 201 is controlled as is also, over line 602, the electric clutch 204. The Logic Unit I is also fed, over the respective lines 603 and 604 by the strain gauge 401 with feed-back signals indicative of the degree of force being exerted by the actuator "I". Hence, for a normal "service" brake operation, the Logic Unit I ensures the necessary degree of operation of the motor 201 and the control of the electric clutch 204 to secure the degree of brake application or release called for by the input signal applied over line 600.

Another Logic Unit II similarly controls the motor 421 and its electric clutch 437 over lines 605 and 606 respectively. Over line 607, the Logic Unit II controls the solenoid 436 and receives an input signal over line 608 from the micro-switch 438. A supply line 609 incorporates an Emergency Switch, the line feeding to both Logic Unit I over line 610 and the Logic Unit II over line 611. Opening of the Emergency Switch operates Logic Unit I to ensure that both the electric motor 201 of the actuator "I" and its clutch 204 cannot be energised by an input signal over line 600 or, if already energised, are de-energised. Over line 611, opening of the Emergency Switch gives an input signal to the Logic Unit II to de-energise the solenoid 436 and the cluch 437 and hold de-energised the motor 421. The maximum degree of braking permitted to be exerted by the actuator "II" is determined by the Logic Unit II upon operation of the micro-switch 438 feeding the Logic Unit II with an input signal over line 608.

We claim:

1. An electric actuator comprising an output member movable to a force exerting position in which said output member exerts a variable output force, spring means for exerting a variable force on said output member to control the variable output force exerted by said output member, an electric motor for determining the output force exerted on said output member by said spring means, a stop means for limiting the maximum value of the output force exerted by said spring means, and adjustment means for varying the position of the stop means in accordance with the maximum value of the output force required to be exerted by the output member.

2. An electric actuator as claimed in claim 1, wherein said adjustment means comprises means for sensing the output force exerted by the output member and for, responsive to sensing that the said output force has reached the required maximum, terminating the operation of the electric motor in a direction so as to further increase the output force generated by the spring means.

3. An electric actuator as claimed in claim 1 wherein said spring means comprises a spring, said actuator further comprising a driven member abutted by one end of said spring and driven by said electric motor to vary the length of the spring, said electric motor being operable to determine the length of said spring and thereby determine the output force generated by the spring means.

4. An electric actuator as claimed in claim 3, wherein the driven member is threadedly-engaged with a threaded member, the electric motor including means for relatively rotating the driven member and the threaded member.

5. An electric actuator as claimed in claim 3 wherein the adjustable stop is arranged so as to be engaged by the driven member as the driven member is driven by the electric motor to vary the length of the spring.

6. An actuator as claimed in claim 3 wherein the spring is a force-applying control spring and the spring means further includes a force-applying power spring for exerting a force on the output member, the control spring being arranged with respect to the power spring such that the force exerted by the control spring is subtracted from the force exerted by the power spring to determine a residual force which constitutes the output force exerted on the output member and the electric motor being operable to vary the length of the control spring and, therefore, the subtractive force exerted by the control spring.

7. An actuator as claimed in claim 6, wherein said electric motor includes a control circuit and the adjustment means comprises an electric switch means, connected in the control circuit of the electric motor, and actuated by the driven member when the driven member reaches a position determined by the length of the control spring which is indicative that the subtractive force being exerted by the control spring has been reduced to a value such that the residual force exerted by the power spring corresponds to the required maximum value of the output force, for, when actuated, terminating operation of the electric motor in a direction further to reduce the force exerted by the control spring.

8. An actuator as claimed in claim 6, wherein the stop means comprises a stop member which physically prevents any further variation of the length of the control spring in the sense further to reduce the subtractive force exerted by the control spring when the control spring is engaged by the driven member.

9. An electric actuator as claimed in claim 8, wherein the stop means comprises a stop member movable with the output member and being variably positional with respect thereto.

10. An electric actuator as claimed in claim 4, wherein the threaded member includes a clutch face and the stop means includes a clutch face engageable with the clutch face of the threaded member to prevent further relative rotation of the driven member and the threaded member.

11. An electric actuator as claimed in claim 10, further comprising means for enabling the clutch face of the threaded member to move axially of the threaded member while preventing rotation of the clutch face, and for restraining the clutch face of the threaded member with respect to the threaded member for axial movement with the driven member while enabling rotational movement of the clutch face of the threaded member with respect to the driven member.

12. An electric actuator as claimed in claim 9, wherein the stop means comprises a stop member which resiliently collapsible in the direction of the length of the control spring.

13. An electric actuator as claimed in claim 2, wherein the spring means comprises a power spring which constitutes the sole spring of the spring means, the electric motor being operable directly to vary the length of the power spring and thus determine the variable output force exerted on the output member.

14. An electric actuator as claimed in claim 3 wherein the actuator comprises a spring-applied actuator including a spring which constitutes the sole spring of the spring means and which is pre-compressed by the electric motor and is subsequently released to apply the output force held stored in the spring by the pre-compression on the output member, the driven member constituting the output member and the electric motor being connected in a control circuit, the adjustment means comprising a switch means connected in the control circuit of the electric motor for terminating further operation of the electric motor when the spring has been compressed to an extent such as to store in the spring a potential output force of the required maximum value.

* * * * *